United States Patent
Akamatsu et al.

(10) Patent No.: US 10,286,597 B2
(45) Date of Patent: May 14, 2019

(54) POLYESTER FILM, LAMINATE, AND METHOD FOR PRODUCING POLYESTER FILM

(71) Applicant: UNITIKA LTD., Hyogo (JP)

(72) Inventors: Ken Akamatsu, Kyoto (JP); Masami Matsumoto, Kyoto (JP)

(73) Assignee: Unitika Ltd., Hyogo (JP)

( * ) Notice: Subject to any disclaimer, the term of this patent is extended or adjusted under 35 U.S.C. 154(b) by 0 days.

(21) Appl. No.: 15/762,652

(22) PCT Filed: Oct. 3, 2016

(86) PCT No.: PCT/JP2016/079270
§ 371 (c)(1),
(2) Date: Mar. 23, 2018

(87) PCT Pub. No.: WO2017/057773
PCT Pub. Date: Apr. 6, 2017

(65) Prior Publication Data
US 2018/0272594 A1   Sep. 27, 2018

(30) Foreign Application Priority Data

Oct. 2, 2015  (JP) ................................. 2015-196896
Jun. 15, 2016  (JP) ................................. 2016-118418

(51) Int. Cl.
*B32B 7/12*  (2006.01)
*B32B 15/08*  (2006.01)
(Continued)

(52) U.S. Cl.
CPC ........ *B29C 55/143* (2013.01); *B29C 47/0004* (2013.01); *B29C 47/0021* (2013.01);
(Continued)

(58) Field of Classification Search
None
See application file for complete search history.

(56) References Cited

U.S. PATENT DOCUMENTS

2004/0142190 A1* 7/2004 Kawai ................. B32B 15/08
                                                        428/461
2005/0123779 A1* 6/2005 Yoshida .............. B29C 55/023
                                                        428/480
(Continued)

FOREIGN PATENT DOCUMENTS

CN   102431177      5/2012
CN   104411751      3/2015
(Continued)

OTHER PUBLICATIONS

Chinese Office Action in corresponding Chinese application No. 201680004500.X dated Mar. 22, 2018.
(Continued)

*Primary Examiner* — Vivian Chen
(74) *Attorney, Agent, or Firm* — Fildes & Outland, P.C.

(57) ABSTRACT

The present invention provides a polyester film, wherein an arbitrary direction on the film surface is defined to have an angle of 0°, and three directions are defined to have angles of 45°, 90°, and 135°, respectively, clockwise from the 0° direction, and the difference between the maximum value and the minimum value of the stresses at 5% elongation in the four directions is 50 MPa or less, the difference between the maximum value and the minimum value of the stresses at 15% elongation in the four directions is 70 MPa or less, and the modulus of elasticity in any one of the four directions falls within a range from 2.0 to 3.5 GPa.

12 Claims, 1 Drawing Sheet

(51) Int. Cl.

| | | |
|---|---|---|
| B32B 15/09 | (2006.01) | |
| B32B 27/36 | (2006.01) | |
| B32B 37/12 | (2006.01) | |
| B29C 48/08 | (2019.01) | |
| B29C 55/12 | (2006.01) | |
| B29C 55/14 | (2006.01) | |
| B29D 7/01 | (2006.01) | |
| C08L 67/02 | (2006.01) | |
| C08L 67/03 | (2006.01) | |
| B29C 48/00 | (2019.01) | |
| C08J 5/18 | (2006.01) | |
| B29C 47/00 | (2006.01) | |
| B29C 55/00 | (2006.01) | |
| B29C 71/02 | (2006.01) | |
| B29K 67/00 | (2006.01) | |
| B29K 509/02 | (2006.01) | |
| B29L 7/00 | (2006.01) | |

(52) U.S. Cl.
CPC ...... *B29C 47/0057* (2013.01); *B29C 48/0018* (2019.02); *B29C 48/022* (2019.02); *B29C 48/08* (2019.02); *B29C 55/005* (2013.01); *B29C 55/12* (2013.01); *B29C 71/02* (2013.01); *B32B 7/12* (2013.01); *B32B 15/09* (2013.01); *B32B 37/12* (2013.01); *C08J 5/18* (2013.01); *B29C 55/14* (2013.01); *B29D 7/01* (2013.01); *B29K 2067/00* (2013.01); *B29K 2509/02* (2013.01); *B29L 2007/008* (2013.01); *B32B 15/08* (2013.01); *B32B 27/36* (2013.01); *B32B 2307/50* (2013.01); *B32B 2307/518* (2013.01); *B32B 2307/708* (2013.01); *B32B 2367/00* (2013.01); *C08L 67/02* (2013.01); *C08L 67/03* (2013.01); *Y10T 428/31681* (2015.04); *Y10T 428/31786* (2015.04)

(56) References Cited

U.S. PATENT DOCUMENTS

| | | | |
|---|---|---|---|
| 2006/0040076 A1 | 2/2006 | Franzyshen et al. | |
| 2010/0249340 A1* | 9/2010 | Takashige | B29C 55/28 |
| | | | 525/509 |
| 2012/0070615 A1 | 3/2012 | Shi et al. | |
| 2013/0260161 A1* | 10/2013 | Nagae | B29C 55/28 |
| | | | 428/480 |
| 2014/0114046 A1* | 4/2014 | Takashige | B29C 55/28 |
| | | | 528/323 |
| 2015/0183204 A1 | 7/2015 | Nanjo et al. | |
| 2016/0365545 A1 | 12/2016 | Takahagi et al. | |

FOREIGN PATENT DOCUMENTS

| | | | |
|---|---|---|---|
| JP | 10-168293 | | 6/1998 |
| JP | 2000-123800 A | * | 4/2000 |
| JP | 2001-150561 | | 6/2001 |
| JP | 2003-220679 | | 8/2003 |
| JP | 2004-066617 A | * | 3/2004 |
| JP | 2004-142373 A | * | 5/2004 |
| JP | 2004-362953 | | 12/2004 |
| JP | 2006-160999 | | 6/2006 |
| JP | 2009-145449 A | * | 7/2009 |
| JP | 2010-168432 | | 8/2010 |
| JP | 2010-253831 A | * | 11/2010 |
| JP | 2012-61831 | | 3/2012 |
| JP | 2012-172091 A | * | 9/2012 |
| JP | 2012-214248 A | * | 11/2012 |
| JP | 2013-28756 | | 2/2013 |
| JP | 2013-225412 A | * | 10/2013 |
| JP | 2013-256047 A | * | 12/2013 |
| JP | 2014-002902 A | * | 1/2014 |
| JP | 2014-195985 | | 10/2014 |
| JP | 2014-229526 | | 12/2014 |
| JP | 2013-056457 A | * | 3/2019 |
| KR | 2015-0035689 | | 4/2015 |
| WO | 2014/017457 | | 1/2014 |
| WO | WO 2014/209056 A | * | 12/2014 |
| WO | 2015/125806 | | 8/2015 |

OTHER PUBLICATIONS

English language abstract of CN 104411751, (2015).
English language abstract of CN 102431177, (2012).
English machine translation of JP2004-362953, (2004).
English machine translation of JP2013-28756, (2013).
English machine translation of JP2006-160999, (2006).
English machine translation of JP2003-220679, (2003).
English machine translation of JP2014-229526, (2014).
English machine translation of JP2001-150561, (2001).
English machine translation of JP2014-195985, (2014).
English machine translation of JP2010-168432, (2010).
English machine translation of JP10-168293, (1998).
Office Action in corresponding Korean patent application No. 2017-7028692, dated Jan. 19, 2018.
English machine translation of Office Action in corresponding Korean patent application No. 2017-7028692, dated Jan. 19, 2018.

* cited by examiner

POLYESTER FILM, LAMINATE, AND METHOD FOR PRODUCING POLYESTER FILM

TECHNICAL FIELD

The present invention relates to a novel polyester film having a stress at elongation falling within a specific range and a modulus of elasticity falling within a specific range, and a method for producing the same. Additionally, the present invention relates to a laminate including the polyester film.

BACKGROUND ART

Polyester films are excellent in heat resistance, chemical resistance, electric insulation and the like, and hence are used in wide fields of packaging film, film for magnetic tape, optical film, film for electronic component and the like.

Recently, outer packaging materials for laminate-type lithium ion batteries, press-through packs and the like have been obtained by cold molding of laminates constituted with resin films and metal foils.

In general, the laminates for performing the cold molding adopt constitutions such as nylon film (Ny)/Al foil/undrawn polypropylene film (CPP), and polyethylene terephthalate film (PET)/Ny/Al foil/CPP; laminates including Al foil have nylon film as laminated therein in order to impart ductility for enabling cold molding.

However, the lamination of a polyamide film directly causes cost increase in production of laminates, moreover unfortunately degrades physical properties due to thermal deterioration under high temperatures and high humidities because polyamide films are poorer in thermal resistance as compared with polyester films, and also disadvantageously causes dimensional changes due to moisture absorption because polyamide films are hygroscopic, thus unfortunately, for example, causing concern about curl in resulting packaging bags.

On the other hand, a polyester film is harder and brittler than a nylon film, and has a large anisotropy because of being generally produced by a tenter-type successive drawing method; thus, it has been difficult to impart ductility to a metal foil laminated on such a polyester film. However, polyester films capable of constituting laminates excellent in cold moldability have been proposed; for example, Patent Literature 1 and Patent Literature 2 each disclose a polyester film for packaging lithium batteries, the polyester film being specified in such a way that the stresses at elongation in the lengthwise direction and widthwise direction of the film fall within specified ranges. Recently, as laminates used for outer packaging materials for laminate-type lithium ion batteries, press-through packs and the like, laminates having a constitution such as PET/Al/CPP using only a polyester film for the outer layer thereof without using any nylon film have been adopted.

In a laminate including a resin film and a metal foil, it is important to impart ductility to the metal foil by the resin film when cold molding is performed, and for that purpose, the resin film is required to extend uniformly in all directions. When a resin film has variations in the physical properties in the four directions, namely, MD, a 45° direction, TD, and a 135° direction, it is difficult to extend the resin film uniformly in an the directions during cold molding. Specifically, when the resin film has an easily extending direction and a hardly extending direction, the metal foil is broken during cold molding, or alternatively delamination or generation of pin holes occurs in the resin film. When such a problem occurs, the molded article cannot perform the functions as a package or the like, and such a problem is liable to lead to the damage of the packaged object (the content). Therefore, the resin film is required to be reduced as much as possible in the variations of the physical properties in the respective directions.

As the factors affecting the moldability during the cold molding, the flexibility of the resin film is quoted. When the resin film is low in flexibility, a strong load is applied to the resin film at elongation in cold molding, and pin holes and delamination possibly occur. Conversely, when the resin film is too high in flexibility, the effect as a substrate to protect the laminate including the metal foil is reduced, and the obtained laminate is degraded in physical properties. Therefore, it is important that the resin film has a flexibility not too high and not too low.

Additionally, the thickness of the resin film is to be mentioned as one of the other physical properties affecting the moldability during the cold molding. When a laminate including a polyester film having thickness variation as laminated is cold molded, the relatively thinner portion of the polyester film is highly liable to be broken to form pinholes or to cause delamination. Therefore, it is important that the polyester film used for cold molding is controlled to be uniform in thickness all over the film.

Recently, resin films used for outer packaging materials for lithium ion batteries and laminates of such films have been required to be more reduced in resin film thickness, with the request for the achievement of further higher output powers of batteries, the miniaturization of batteries, and the cost reduction for batteries. In general, resin films ensure the thickness uniformity more easily with the increase of the thickness; however, with the decrease of the thickness (in particular, when the thickness is 25 µm or less), the uniformity of the thickness is more degraded, and accordingly the effect on the moldability is more remarkable.

As described above, the development of a polyester film has been earnestly desired as the resin film being comparatively small in the variations of the physical properties in the above-described four directions, having a flexibility falling in an appropriate range, moreover being excellent in the thickness uniformity, and at the same time, having a satisfactory cold moldability although being thinner however, as affairs stand, such a film has never been developed.

CITATION LIST

Patent Literature

Patent Literature 1: JP2004-362953A
Patent Literature 2: WO2015/125806

SUMMARY OF INVENTION

Technical Problem

An object of the present invention is to provide a polyester film being suppressed n the variations of the physical properties in the above-described four directions, having a just enough flexibility, also being excellent in thickness uniformity, accordingly imparting a satisfactory ductility to a laminated metal foil, being excellent in heat resistance, and being suitable for use in cold molding.

Solution to Problem

The present inventors performed a diligent study in order to solve the foregoing technical problem, and consequently have reached the present invention by discovering that it is possible to obtain a polyester film, being suppressed in the variations of the physical properties in the four directions, having an appropriate flexibility, and being excellent in the thickness uniformity, by regulating the drawing magnification and the temperature during drawing so as to fall within specific ranges.

Specifically, the gist of the present invention is as follows.

(1) A polyester film, wherein an arbitrary direction on the film surface is defined to have an angle of 0°, and three directions are defined to have angles of 45°, 90°, and 135°, respectively, clockwise from the 0° direction, and the difference between the maximum value and the minimum value of the stresses at 5% elongation in the four directions is 50 MPa or less, the difference between the maximum value and the minimum value of the stresses at 15% elongation in the four directions is 70 MPa or less, and the modulus of elasticity in any one of the four directions fails within a range from 2.0 to 3.5 Pa.

(2) The polyester film according to (1), wherein the dry heat shrinkage rate in any one of the four directions falls within a range from 0 to 10%.

(3) The polyester film according to (1) or (2), wherein the average value of the thicknesses in the four directions is 30 μm or less, (4) The polyester film according to any one of (1) to (3), wherein the standard deviation of the thicknesses in the our directions is 0.4 μm or less, (5) A laminate including the polyester film according to any one of (1) to (4) and a metal foil.

(6) A laminate including a metal foil, an adhesive layer, and the polyester film according to any one of (1) to (4) as laminated in the mentioned order.

(7) A method for producing the polyester film according to any one of (1) to (4), wherein an undrawn sheet is successively or simultaneously biaxially drawn in such a way that the drawing magnification ($DR_{MD}$) in the longitudinal direction (MD) and the drawing magnification ($DR_{TD}$) in the transverse direction (TD) satisfy the following (a) and (b):

$$0.70 \leq DR_{MD}/DR_{TD} \leq 0.90 \quad (a)$$

$$12.5 \leq DR_{MD} \times DR_{TD} \leq 15.5 \quad (b)$$

(8) The method for producing a polyester film according to (7), wherein the drawing is a success biaxial drawing, the first drawing for obtaining the first drawn film by drawing the undrawn sheet in the longitudinal direction (MD) is performed in a temperature range from 65 to 105° C., and the second drawing for obtaining the second drawn film by drawing the first drawn film in the transverse direction (TD) is performed in a temperature range from 90 to 160° C.

(9) The method for producing a polyester film according to (7) or (8), wherein the film after the biaxial drawing is heat treated in a temperature range from 160 to 210° C.

Advantageous Effects of Invention

Because the polyester film of the present invention is excellent in the stress balance at elongation in the four directions, and additionally has an appropriate flexibility, the laminate including a metal foil as laminated on the polyester film of the present invention allows the metal foil to have a satisfactory ductility, is free from the occurrence of the breakage of the metal foil, delamination, and pinholes when subjected to draw molding (in particular, deep draw molding or stretch molding) in cold molding, and thus allows high quality products (molded articles) having high reliability to be obtained.

Moreover, because even when the polyester film of the present invention has a thickness as thin as 25 μm or less, the polyester film of the present invention is excellent in the stress balance at elongation in the four directions, and additionally excellent in the thickness uniformity in the four directions, the laminate including the polyester film and a metal foil as laminated on each other allows miniaturized products to be obtained by cold molding, and is advantageous from the viewpoint of cost.

In addition, conventional polyester films are poor in cold moldability, and accordingly when laminates are formed by using conventional polyester films, lamination of resin films having ductility such as polyamide films is required; however, the polyester film of the present invention has a sufficiently excellent cold moldability without laminating a polyamide film, accordingly allows the laminating step to be shortened, and miniaturized products to be obtained, and thus allows laminates excellent in economic efficiency to be provided.

In addition, according to the production method of the present invention, by regulating the drawing magnifications in MD and TD and the temperature during drawing so as to fall within specific ranges, it is possible to produce a polyester film having such excellent properties as described above, efficiently and within a satisfactory productivity.

DESCRIPTION OF EMBODIMENTS

Figure 1:
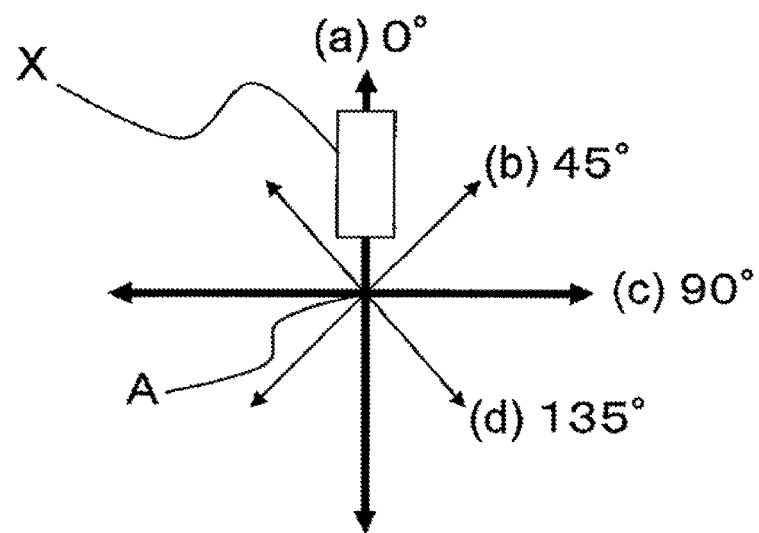
FIG. 1 is a diagram illustrating a sampling position of a sample for measuring the stress at elongation of a polyester film.

Hereinafter, the present invention is described in detail.

Examples of the polyester resin constituting the polyester film of the present invention include a polyester resin constituted with a dicarboxylic acid component and a diol component, and a polyester resin constituted with a hydroxycarboxylic acid component.

Examples of the dicarboxylic acid component include terephthalic acid, isophthalic acid, phthalic acid, 2,6-naphthalene dicarboxylic acid, 5-sodium sulfoisophthalic acid, oxalic acid, succinic acid, adipic acid, sebacic acid, azelaic acid, dodecanedioic acid, dimer acid, maleic anhydride, maleic acid, fumaric acid, itaconic acid, citraconic acid, mesaconic acid, and cyclohexane dicarboxylic acid.

Examples of the diol component include ethylene glycol, diethylene glycol, 1,3-propanediol, 1,4-butanediol, neopentyl glycol, 1,6-hexanediol, cyclohexanedimethanol, triethylene glycol, polyethylene glycol, polypropylene glycol, polytetramethylene glycol, and ethylene oxide adducts of bisphenol A and bisphenol S.

Examples of the hydroxycarboxylic acid component include ε-caprolactone, lactic acid, and 4-hydroxy benzoic acid.

The polyester resin (hereinafter, sometimes abbreviated as "the polyester resin (R) in the present invention") constituting the polyester film of the present invention may be either a homopolymer or a copolymer constituted with the above-described components, and may further include small amounts of trifunctional compound components such as trimellitic acid, trimesic acid, pyromellitic acid, trimethylolpropane, glycerin, and pentaerythritol.

The polyester resin (R) in the present invention may use, in combination, two or more homopolymers and copolymers composed of the above-described components.

Among these, the polyester resin (R) in the present invention is a polyester resin having a limiting viscosity, before being used in the method for producing a polyester film of the present invention, of preferably 0.65 to 0.88, and in particular, preferably 0.67 to 0.84. When the limiting viscosity of the polyester resin (R) falls within the above-described range, the polyester film of the present invention can be obtained by the below-described production method of the present invention. When the limiting viscosity of the polyester resin (R) does not fall within the above-described range, it tends to be difficult to obtain the film satisfying the stress balance at elongation and the moduli of elasticity in the four directions, specified in the present invention.

For the purpose of regulating the limiting viscosity of the polyester resin (R) in the present invention so as to fall within the above-described range, the temperature and the time of the polymerization may be regulated, and solid phase polymerization may also be performed in addition to melt polymerization.

The limiting viscosity of the polyester resin (R) the present invention is measured by dissolving 0.25 g of the polyester resin in 50 ml of phenol/tetrachloroethane=5/5 (mass ratio), and by using an Ubbelohde viscometer at 25° C.

Further specifically, the polyester resin (R) in the present invention preferably includes a polybutylene terephthalate resin (A) and a polyethylene terephthalate resin (B). In particular, in the polyester resin (R) in the present invention, the proportion of the polybutylene terephthalate resin (A) and the polyethylene terephthalate resin (B) is preferably 90% by mass or more, and in particular preferably 95% by mass or more.

In the present invention, the polybutylene terephthalate resin (A) contains terephthalic acid and 1,4-butanediol as the main polymerization components thereof, and may contain additionally other components as copolymerized therewith. As the copolymerization components, the dicarboxylic acid components and the diol components described above as examples can be used.

In the present invention, when a copolymer is used as the polybutylene terephthalate resin (A) the types of the components to be copolymerized may be appropriately selected; however, the proportions of the copolymerization components, namely, the proportion of the dicarboxylic acid component and the proportion of the diol component are both preferably 20 mol % or less, and more preferably 10 mol % or less. When the proportion of the copolymerization component exceeds 20 mol %, the melting point of the polybutylene terephthalate resin (A) is sometimes lower than the below-described range, and consequently the crystallinity of the polybutylene terephthalate resin (A) is sometimes degraded, and the heat resistance of the polyester film is sometimes degraded.

In the polyester film of the present invention, the melting point of the polybutylene terephthalate resin (A) is preferably 200 to 223° C., and more preferably 210 to 223° C. When the melting point concerned is lower than 200° C., the heat resistance of the polyester film is degraded.

The polyethylene terephthalate resin (B) in the present invention contains terephthalic acid and ethylene glycol as the main polymerization components thereof, and may contain additionally other components as copolymerized therewith. As the copolymerization components, the dicarboxylic acid components and the diol components described above as examples can be used.

In addition, the proportions of the copolymerization components, namely, the proportion of the acid component and the proportion of the alcohol component are both preferably 20 mol % or less, and more preferably 10 mol % or less.

The melting point of the polyethylene terephthalate resin (B) is preferably 225 to 260° C., and more preferably 240 to 260° C. When the melting point concerned is lower than 225° C., the heat resistance of the polyester film is degraded.

In the polyester resin in the present invention, the mass ratio (A/B) between the polybutylene terephthalate resin (A) and the polyethylene terephthalate-based resin B) is preferably 5/95 to 40/60, more preferably 5/95 to 30/70, and further preferably 5/95 to 25/75.

As compared with the polyethylene terephthalate resin (B), the polybutylene terephthalate resin (A) is larger by two in the number of the carbon atoms of the aliphatic chain contained in the unit skeleton, and accordingly higher in the mobility of the molecular chain and higher in flexibility. By mixing the polybutylene terephthalate resin (A) with the polyethylene terephthalate resin (B), the obtained polyester film is increased in flexibility. In other words, when the mass proportion of the polybutylene terephthalate resin (A) is increased within the above described range, the flexibility of the polyester film is improved. On the other hand, when the mass proportion of the polybutylene terephthalate resin (A) is lower than the above-described range, the obtained polyester film is low in flexibility and high in modulus of elasticity. In addition, the mass proportion of the polybutylene terephthalate resin (A) is higher than the above-described range, the obtained polyester film undergoes an intense manifestation of the properties of the polybutylene terephthalate resin (A), thus comes to be too flexible, comes to be low modulus of elasticity, and is decreased in heat resistance, as the case may be.

The polyester resin (R) in the present invention in addition to the above-described polyester resin containing the polybutylene terephthalate resin (A) and the polyethylene terephthalate resin (B), preferably a polyester resin containing two types of polyethylene terephthalate resins (B), namely, the polyethylene terephthalate resin (Bc) containing a copolymerization component and the polyethylene terephthalate resin (Bh) substantially containing no copolymerization component. Above all, in the polyester resin (R) in the present invention, the proportion of the polyethylene terephthalate resins (Bc) and (Bh) is preferably 90% by mass or more, and in particular, preferably 95% by mass or more.

As the polyethylene terephthalate resin (Bc) containing a copolymerization component, the polyethylene terephthalate copolymerizing with isophthalic acid is preferable, and the melting point of the polyethylene terephthalate resin (BC) containing a copolymerization component is preferably 200 to 225° C., and more preferably 210 to 225° C. When the melting point is lower than 200° C., the heat resistance of the polyester film is degraded.

When the polyester resin (R) in the present invention contains the polyethylene terephthalate resins (Bc) and (Bh), the mass ratio (Bc/Bh) between (Bc) and (Bh) preferably 5/95 to 40/60, more preferably 5/95 to 30/70, and further preferably 5/95 to 25/75.

The methods for polymerizing the above-described polybutylene terephthalate resin (A) and the polyethylene terephthalate resin (B) are not particularly limited; examples of such methods include a transesterification method and a direct polymerization method. Examples of the transesterification catalyst include oxides and acetates of Mg, Mn, Zn, Ca, Li, and Ti. In addition, examples of the polycondensation catalyst include oxides and acetates of Sb, Ti, and Ge.

The polyester after polymerization includes monomers, oligomers, and acetaldehyde and tetrahydrofuran as by-products, and accordingly may be subjected to a solid phase polymerization, under a reduced pressure or in a flow of an inert gas, at a temperature of 200° C. or higher.

In the polymerization of the polyester resin, it possible to add, if necessary, additives such as an antioxidant, a heat stabilizer, an ultraviolet absorber, and an antistatic agent. Examples of the antioxidant include hindered phenolic compounds and hindered amine-based compounds; examples of the heat stabilizer include phosphorus-based compounds; and examples of the ultraviolet absorber include benzophenone-based compounds and benzotriazole-based compounds. In addition, when the polyester resin includes two or more resins as in the case where the polyester resin includes the polybutylene terephthalate resin (A) and the polyethylene terephthalate resin (B), it is preferable to add a phosphorus-based compound(s) as a reaction inhibitor to inhibit the reactions between or among these resins.

Next, the values of the properties of the polyester film of the present invention are described. It is essential that the polyester film of the present invention simultaneously satisfy the following (1) and (2) as an index indicating that the stress balance at elongation in the secondary processing is extremely excellent. Specifically, it is essential that in the polyester film of the present invention, (1) an arbitrary direction on the film surface is defined to have an angle of 0°, and three directions are defined to have angles of 45°, 90°, and 135°, respectively, clockwise from the 0° direction, and the difference between the maximum value and the minimum value of the stresses at 5% elongation in the four directions is 50 MPa or less; and (2) the difference between the maximum value and the minimum value of the stresses at 15% elongation in the four directions is 70 MPa or less, When the difference ($\Delta F5$) between the maximum value and the minimum value of the stresses (F5s) at 5% elongation in the four directions, and the difference ($\Delta F15$) between the maximum value and the minimum value of the stresses (F15s) at 15% elongation in the four directions exceed the above-described ranges, the polyester film is poor in the stress balance in all the directions, and makes it difficult to obtain a uniform moldability. For example, in the case where a laminate including a metal foil as laminated on the polyester film is subjected to a cold molding, a polyester film being not uniform in moldability does not impart a sufficient ductility to the metal foil (in other words, the polyester film hardly follows the metal foil), and accordingly sometimes the breakage of the metal foil occurs, or alternatively failures such as delamination or pinholes tend to occur.

The $\Delta F5$ is required to be 50 MPa or less, and is preferably 35 MPa or less, more preferably 25 MPa or less, and further preferably 15 MPa or less. The $\Delta F15$ is required to be 70 MPa or less, and is preferably 60 MPa or less, more preferably 50 MPa or less, and further preferably 35 MPa or less, In general, when a film is produced by a tenter-type successive drawing method, the film is obtained in a form of a film roll being taken up around a cylinder, and the winding width of the obtained film roll is usually approximately 2 to 8 m. Then, the obtained film roll is subjected to a slitting, and the film is delivered as products having winding widths of approximately 1 to 3 m. In the tenter-type successive drawing method, drawing is applied by gripping both edges of the film with clips, and accordingly, the difference of the stress at elongation tends to occur between the central portion in the winding width and the edges of the film roll.

However, according to the production method of the present invention, the difference of the stress at elongation in the wound film hardly occurs between the edges and the vicinity of the central portion of the obtained film roll; even in the polyester film wound in the edge of the film roll, the values of $\Delta F5$ and $\Delta F15$ fall within the above-described ranges, respectively.

According to the production method of the present invention, of the obtained polyester films, the polyester films in the vicinity of the central portion of the film roll can have a $\Delta F5$ value of 15 MPa or less, and a $\Delta F15$ value of 35 MPa or less.

Any one of the stresses (F5) of the polyester film at 5% elongations in the four directions is preferably 80 to 130 MPa, more preferably 85 to 125 MPa, and further preferably 90 to 120 MPa, from the viewpoint of the cold moldability when incorporated into laminates. Any one of the stresses (F15) of the polyester film at 15% elongations in the four directions is preferably 80 to 160 MPa, more preferably 90 to 155 MPa, and further preferably 95 to 150 MPa, from the viewpoint of the cold moldability when incorporated into laminates.

When the stresses in the four directions at 5% and 15% elongations do not satisfy the above-described ranges, the polyester film of the present invention does not acquire a sufficient cold moldability, The stresses of the above-described four directions in the film of the present invention are measured as follows. First, the polyester film is humidity-conditioned at 23° C. and 50% RH for 2 hours, then as shown in FIG. 1, an arbitrary point A on the film is taken as the central point, and the reference direction (0° direction) of the film is arbitrarily specified; the following four directions are taken as the measurement directions: the reference direction (a), and a 45° direction (b), a 90° direction (e), and a 135° direction (d) clockwise from the reference direction (a); in each of the measurement directions, a strip form having a length of 100 mm in the measurement direction and a width of 15 mm in the direction perpendicular to the measurement direction is cut out to be used as a sample. For example, as shown in FIG. 1, in the 0° direction, a sample X (100 mm in length×15 mm in width) is cut out in the range of 30 mm to 130 mm from the central point A. For the other directions, samples are cut out in the same manner as described above. The stress (F5) at 5% elongation and the stress (F15) at 15% elongation of each of these samples are measured by using a tensile tester (AG-1S, manufactured by Shimadzu Corp.) equipped with a load cell for 1 kN measurement and sample chucks, at a tensile rate of 500 mm/min. In each of the directions, for each of F5 and F15, the measurement is performed with a number of samples of 5, the average value is calculated, and thus, the stress value in each of the directions is determined. Then, for each of F5 and F15, the difference between the maximum value and the minimum value of the stress values in the four directions is determined.

It is to be noted that as for the reference direction (0°), when the MD in the drawing step in the film production is known, MD is preferably taken as the reference direction.

Next, as the index indicating that the polyester film of the present invention has a flexibility suitable for the cold moldability, the moduli of elasticity in the four directions are required to fall within a range from 2.0 to 3.5 GPa for any direction, and in particular, fall preferably within a range from 2.2 to 3.4 GPa, and more preferably within a range from 2.4 to 3.3 GPa.

In the polyester film of the present invention, when the stress balance at elongation in each of the four directions simultaneously satisfies (1) and (2), and the moduli of elasticity in the four directions fall within the above described range, the advantageous effects of the present invention can be achieved. In other words, the laminate including a metal foil as laminated on the polyester film of the present invention allows the metal foil to have a satisfactory ductility, is free from the occurrence of the breakage of the metal foil, delamination, and pinholes when subjected to draw molding (in particular, deep draw molding or stretch molding) in cold molding, and thus allows high quality products (molded articles) having high reliability to be obtained. When any of the moduli of elasticity in the four directions is less than 2.0 GPa, the flexibility of the polyester film comes to be too large. On the other hand, any of the moduli of elasticity in the four directions exceeds 3.5 GPa, the flexibility of the polyester film is degraded. In the case where any of the moduli of elasticity in the four direction falls outside the range of the present invention, even when the stress balance at elongation in each of the four directions simultaneously satisfies (1) and (2), the polyester film cannot impart a satisfactory ductility to the metal foil, and thus the cold moldability is degraded.

It is to be noted that the moduli of elasticity in the four directions in the polyester film of the present invention are measured by using the tensile tester (AG-19, manufactured by Shimadzu Corp.) when the stresses of the four directions are measured.

Next, as the index indicating that the polyester film of the present invention has a flexibility suitable for the cold moldability, all the dry heat shrinkage rates in the four directions fall preferably within a range from 0 to 10%, more preferably within a range from 2 to 9.5%, further preferably within a range from 2.5 to 9.0%, When all the dry heat shrinkage rates in the four directions fall within the above-described range, the polyester film has the crystallization falling within the optimal range, and has the flexibility suitable for cold moldability.

When any one of the dry heat shrinkage rates in the four directions exceeds 10%, the degree of crystallization of the polyester film is not sufficient, and the flexibility is sometimes too large. On the other hand, when the dry heat shrinkage rates in the four directions are less than 0%, the degree of crystallization of the polyester film is excessive, and the flexibility is sometimes degraded. In either case, the cold moldability is degraded.

The dry heat shrinkage rates of the four directions in the polyester film of the present invention are measured as follows.

According to the sampling method of the sample used in the measurement of the stress at elongation, for each of the measurement directions, a sample was obtained by cutting the polyester film in a strip form of 100 mm in length from the central point A in the measurement direction and 10 mm in the direction perpendicular to the measurement direction.

The sample is humidity-conditioned at 23° C. and 50% RH for 2 hours (humidity conditioning 1), then exposed to dry air at 160° C. for 15 minutes, and then humidity-conditioned at 23° C. and 50% RH for 2 hours (humidity conditioning 2). The sample length after the humidity conditioning 1 and the sample length after the humidity conditioning 2 are measured, and the dry heat shrinkage rate is derived by using the following formula. It is to be noted that the measurement is performed with the number of the samples of 5, and the average value is taken as the dry heat shrinkage rate.

Dry heat shrinkage rate (%)={(sample length after humidity conditioning 1−sample length after humidity conditioning 2)/sample length after humidity conditioning 1}×100

As the index indicating that the polyester film of the present invention has an extremely high thickness precision (thickness uniformity), the standard deviation of the measured values of the thicknesses at individual measurement points is preferably 0.4 μm or less, more preferably 0.3 μm or less, and further preferably 0.28 μm or less, wherein the plurality of measurement points are set in the four directions from the reference point set on the film.

When the standard deviation indicating the thickness precision (thickness uniformity) is 0.4 μm or less, the polyester film has an extremely small thickness variation; thus, for example, even when the thickness is 15 μm or less, a laminate including the polyester film and a metal foil as laminated on the polyester film is free from the occurrence of the failures such as delamination and pinholes when subjected to a deep draw cold molding, and thus a satisfactory moldability can be obtained.

When the standard deviation exceeds 0.4 μm, the polyester film has a low thickness precision; in particular, when the polyester film has a small thickness, the lamination of the polyester film with a metal foil cannot impart a sufficient ductility to the metal foil, consequently the occurrence of delamination or pinholes comes to be remarkable, and sometimes no satisfactory moldability is obtained.

Figure 2:
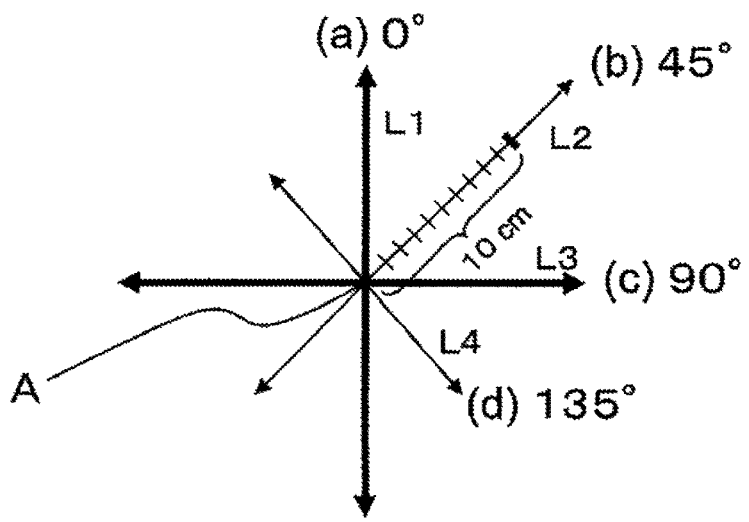
FIG. 2 is a diagram illustrating a method for measuring the thickness of a polyester film.

The above-described evaluation method of the thickness precision is performed as follows. First, the polyester film is humidity-conditioned at 23° C. and 50% RH for 2 hours, then as shown in FIG. 2, an arbitrary position on the film is taken as the central point A, and the reference direction (0° direction) of the film is arbitrarily specified; the following four directions are taken as the measurement directions: the reference direction (a) and the 45° direction (b), the 90° direction (c), and the 135° direction (d) clockwise from the reference direction (a); the four straight line sections L1 to L4 each having a length of 100 mm are drawn in these four directions, respectively. In each of the straight line sections, the thicknesses at 10 points at intervals of 10 mm from the central point are measured with a length gauge (HEIDENHAIN-METRO MT1287, manufactured by Heidenhain Corp.). Then, the average value of the thicknesses at 40 points obtained by the measurements in the four straight line sections was calculated to be taken as the thickness. The standard deviation is also calculated by using the measured values of the thicknesses at the 40 points. It is to be noted that as for the reference direction, when the MD in the drawing step in the film production is known, MD is preferably taken as the reference direction.

In the present invention, the average thickness and the standard deviation may be referred to an arbitrary point (point A) on the polyester film; however, according to the production method of the present invention, the polyester films wound even at the edges and in the vicinity of the central portion of the obtained film roll can have the average thicknesses and the standard deviations falling within the above-described ranges.

In the polyester film of the present invention, the average value of the thickness is preferably 30 μm or less, more preferably 26 μm or less, and further preferably 16 μm or less. The polyester film of the present invention is suitable for forming a laminate by being laminated with a metal foil, and suitable for the application to cold molding; however, by performing such a biaxial drawing using a tenter as described below under the drawing conditions satisfying specific conditions, even a film having a small thickness can be made excellent in the stress balance at elongation in each of the four directions, and can achieve an extremely high thickness precision (thickness uniformity and the like) in each of the four directions.

When the average value of the thickness of the polyester film exceeds 30 μm, the polyester film is degraded in moldability, and is sometimes hardly usable for the outer packaging materials for small batteries, and is also liable to be disadvantageous from the aspect of cost.

The polyester film finds difficulty in imparting a sufficient ductility to a metal foil, with the decrease of the thickness thereof. In other words, with the decrease of the thickness, the obtained film tends to be decreased in the thickness precision, and tends to undergo the variation of the stress at elongation; thus, the press force during cold molding results in remarkable breakage of the polyester film or the metal foil. In contrast, the adoption of a below-described specific production method allows the polyester film of the present invention to succeed in providing a polyester film excellent in the stress balance at elongation in the four directions, and high in the thickness uniformity, in particular, even when the thickness is 26 μm or less. The lower limit of the thickness of the polyester film of the present invention is not particularly limited, but may usually be approximately 2 μm. When the average value of the thickness is less than 2 μm, the lamination of the polyester film with a metal foil tends to insufficiently impart the ductility to the metal foil.

The polyester film of the present invention may include particles as added therein in the below-described product on method of the present invention in order to improve the windability of the obtained polyester film. The particles mixed in the polyester film are not particularly limited as long as the particles are particles capable of imparting easy slidability; example of such particles include inorganic particles of silica, calcium carbonate, magnesium carbonate, barium carbonate, calcium sulfate, calcium phosphate, magnesium phosphate, kaolin, aluminum oxide, and titanium oxide. Alternatively, heat-resistant organic particles of a thermosetting urea resin, a thermosetting phenol resin, a thermosetting epoxy resin, and a benzoguanamine resin may be used. Moreover, it is also possible to use precipitated particles produced by precipitation and microdispersion of a fraction of a metal compound such as a catalyst, in the production process of the polyester resin.

The shape of the particles to be used is not particularly limited, and any of a spherical shape, an aggregated shape, a rod-like shape and a flat shape may be used. The hardness, the specific gravity and the color of the particles to be used are also not particularly limited. These particles may be used in combinations of two or more types of particles, if necessary.

At least on one surface of the polyester film of the present invention, one or more coating layers according to the purpose may be laminated. Examples of the coating layer include the coating layers capable of imparting electrolytic solution resistance, acid resistance, alcohol resistance, scratch resistance, antistatic property, printing adaptability, and adhesiveness.

In addition, as the easy adhesion treatment for improving the adhesion between a substrate and an aluminum foil, the easy adhesion effect may be developed by applying a surface treatment on the polyester film.

Above all, the polyester film of the present invention preferably has a primer layer at least on one surface thereof, as a coating layer for improving adhesiveness. By having a primer layer, the laminate including the polyester film of the present invention and a metal foil laminated on each other is improved in the adhesiveness between the polyester film and the metal foil, and thus the polyester film can more effectively impart the ductility to the metal foil, when the laminate is subjected to cold molding, the metal foil comes to be hardly broken, and additionally the provision of the primer layer displays the effect to suppress the delamination.

Examples of the main component of the primer layer elude a water-soluble or water-dispersible polyurethane compound, an acryl compound and a polyester compound; the main component of the primer layer is preferably an anionic water-dispersible polyurethane resin. Examples of the curing agent of the primer layer include a melamine compound, an isocyanate compound, and an oxazoline compound.

The thickness of the primer layer is preferably 0.01 to 0.5 μm. When the thickness of the primer layer thinner than 0.01 μm, the adhesiveness of the primer layer is degraded. When the thickness of the primer layer is thicker than 0.5 μm, no significant change is found, for example, in the improvement of the easy adhesion of the primer layer, but instead, brushing or blocking occurs in the film scroll, there are caused adverse effects such as the show-through of the primer layer, the breakage of the primer layer and moreover the film cutting during winding off of the film, and cost disadvantage is involved.

As the method for applying the aqueous solutions or the aqueous dispersions of the above-described compounds in order to form the primer layer, heretofore known arbitrary methods can be selected; for example, a bar-coating method, an air knife coating method, a reverse roll coating method, and a gravure roll coating method can be applied.

To the primer layer, if necessary, a lubricant for b preventing blocking, and a wetting material for improving the coating property may be added, within a range not affecting the adhesiveness.

Hereinafter, the method for producing a polyester film of the present invention is described in detail. The production method of the present invention makes it possible to obtain the polyester film of the present invention satisfying the above-described values of the properties.

The production method of the present invention is described by taking as an example the production of the polyester film composed of the polyester resin CR) including the polybutylene terephthalate resin (A) and the polyethylene terephthalate resin (B). The polyester film of the present invention can be produced by a sheet molding, step and a successive drawing step.

In the sheet molding step, an undrawn sheet is obtained by molding the polyester resin (R) into a sheet shape.

The polyester resin (R) can be prepared by a heretofore known method. For example, the polyester resin (R) can be obtained by placing a raw material including the polybutylene terephthalate resin (A) and the polyethylene terephthalate resin (B) in an extruder equipped with a heating device, and melt kneading the raw material at 270 to 300° C. for 3 to 15 minutes. The melt kneaded resin composition is extruded by using a T-die, the extruded resin composition is cooled and solidified, for example, by using a casting drum regulated in temperature at 50° C. or lower, and thus an undrawn sheet as a sheet shaped molded article can be obtained.

The average value of the thickness of the undrawn sheet is not particularly limited, but in general is preferably approximately 15 to 250 μm, and more preferably 50 to 235 μm. The average value of the thickness of the undrawn sheet falling within the above-described range allows the undrawn sheet to be drawn more efficiently.

In the drawing step, a drawn film is obtained by biaxially drawing the undrawn sheet successively or simultaneously in the longitudinal direction (MD) and the transverse direction (TD).

Examples of the simultaneous biaxial drawing include a method in which the simultaneous biaxial drawing in MD and TD is performed by using a tenter in such a way that both ends of the undrawn film are gripped, and the undrawn film is drawn simultaneously both in MD and in TD.

On the other hand, in the successive biaxial drawing, it is preferable to draw in at least one direction of MD and TD by using a tenter, and this way allows a more uniform film thickness to be obtained. The successive biaxial drawing using a tenter can be, for example, either of the following methods (1) and (2): (1) a method in which an undrawn sheet is drawn in MD by making the undrawn sheet to pass through a plurality of rolls different in the rotational speed from each other, and then the drawn film is drawn in TD by using a tenter; (2) a method in which an undrawn sheet is drawn in MD by using a tenter, and then the drawn film is drawn in TD by using a tenter. From the viewpoint of the physical properties of the obtained film, the productivity and the like, the method (1) is particularly preferable. The successive biaxial drawing using a tenter draws the film in MD by using rolls, hence is advantageous, for example, from the viewpoint of the productivity and facilities, and draws in TD by using a tenter, hence is advantageous, for example, from the viewpoint of the control of the film thickness.

In the production method of the present invention, the drawing step is required to successively or simultaneously biaxially draw an undrawn sheet in such a way that the MD drawing magnification ($DR_{MD}$) and the TD drawing magnification ($DR_{TD}$) simultaneously satisfy the following (a) and (b); this is an important point.

$$0.70 \leq DR_{MD}/DR_{TD} \leq 0.90 \quad (a)$$

$$12.5 \leq DR_{MD} \times DR_{TD} \leq 15.5 \quad (b)$$

When either one of the above-described (a) and (b) is not satisfied, the obtained polyester film is poor in the balance of the stresses in the four directions, and it is difficult to obtain the polyester film of the present invention.

Specifically, when the drawing magnification ratio ($DR_{MD}/DR_{TD}$) is less than 0.70, the TD magnification is higher than the MD magnification, and consequently the polyester film has a high stress value in the TD stress-distortion curve, and exhibits a low degree of elongation. On the other hand, when the drawing magnification ratio ($DR_{MD}/DR_{TD}$) exceeds 0.90, the MD magnification is higher than the TD magnification, and consequently the polyester film has a high stress value in the MD stress-distortion curve, and exhibits a low degree of elongation. In addition, the 45° direction and 135° direction stress-distortion curves are also affected, and consequently it is difficult to obtain a polyester film simultaneously satisfying the conditions of the differences (ΔF5, ΔF15) between the maximum values and the minimum values of the stresses at elongation, specified in the present invention.

In addition, when the area magnification ($DR_{MD} \times DR_{TD}$) is less than 12.5, the area magnification is too low, accordingly the drawing is insufficient, and consequently the polyester film does not acquire a sufficient molecular orientation. On the other hand, when the area magnification ($DR_{MD} \times DR_{TD}$) exceeds 15.5, the area magnification is too high, accordingly it is impossible to draw the polyester film uniformly in all the directions during drawing, and consequently, it is difficult to simultaneously satisfy the conditions of the differences (ΔF5, ΔF15) between the maximum values and the minimum values of the stresses at elongation, specified in the present invention.

The drawing magnification ratio ($DR_{MD}/DR_{TD}$) and the area magnification ($DR_{MD} \times DR_{TD}$) are required as described above to satisfy (a) and (b), and in particular, $DR_{MD}$ is set to be preferably 3.0 to 3.7, and further preferably 3.1 to 3.6.

When the successive biaxial drawing is performed, a first drawing for obtaining a first drawn film by drawing an undrawn sheet in the longitudinal direction (MD) is performed preferably in a temperature range from 65 to 105° C., in particular, preferably in a temperature range from 70 to 100° C. Next, a second drawing for obtaining a second drawn film by drawing the first drawn film in the transverse direction (TO) is performed preferably in a temperature range from 90 to 160° C., in particular, preferably in a temperature range from 100 to 150° C. The temperature in the drawing step can be set and controlled, while preheating is being performed, for example, by using a preheating roll or a preheating zone of a tenter.

By setting the temperature range of the first drawing and the temperature range of the second drawing so as to fall within the above-described ranges, the polyester film of the present invention can be obtained certainly. In addition, both in the first drawing and the second drawing, within the above described temperature ranges, the temperature is preferably increased sequentially along the film taking-up direction.

In addition, both in the simultaneous biaxial drawing using a tenter and in the successive biaxial drawing using a tenter, it is preferable to perform a relaxation heat treatment after the drawing. The temperature in the relaxation heat treatment is preferably 160 to 210° C., and more preferably 170 to 210° C. The temperature in the relaxation heat treatment can be set and controlled in the relaxation heat treatment zone of the tenter. The relaxation rate in the relaxation heat treatment is preferably 2 to 9%, in particular, preferably 3 to 7%.

As the procedures for setting the temperatures during the drawing and the relaxation heat treatment within the above-described ranges, there are a method in which hot air is blown to the film surface, a method in which an infrared ray or near infrared ray heater is used, and a method in which these methods are combined; in the present invention, it is preferable to include the method in which hot air is blown.

In addition, when the polyester film of the present invention having an easy adhesion layer at least on one surface of the film surfaces is obtained, it is preferable to perform the production of the film by the same drawing method and the same drawing conditions as described above. It is to be noted that in order to form an easy adhesion layer on the film surface, it is preferable to apply an aqueous coating agent for forming an easy adhesion layer to the polyester film drawn in MD in the above-described production method. In addition, it is preferable to successively draw the film, together with the aqueous coating agent, in TD under the same drawing conditions as described above (in-line coating). The coating amount of the aqueous coating agent is preferably regulated in such a way that the thickness of the easy adhesion layer formed on the film surface after the drawing is 0.01 to 0.10 μm.

The laminate of the present invention includes a polyester film and a metal foil. Typical examples of the laminate of the present invention include a laminate including the polyester film of the present invention and a metal foil laminated on the film. In this case, the polyester film of the present invention and the metal foil may be laminated so as to be brought into direct contact with each other, or may be laminated in a state of allowing another layer, such as an adhesive layer, to intervene therebetween. In particular, in the present invention, the laminate is preferably a laminate in which the layers are laminated in the order of film of present invention/metal foil/sealant film. In this case, an adhesive layer may be allowed or not allowed to intervene between each pair of adjacent layers.

It is to be noted that the polyester film of the present invention is capable of imparting a satisfactory ductility to the metal foil, and accordingly does not need the lamination of another resin film having ductility such as a polyamide film.

Examples of the metal foil include metal foils (inclusive of alloy foils) of various metal elements (such as aluminum, iron, copper and nickel); in particular, a pure aluminum foil or aluminum alloy foils are suitably used. The aluminum alloy foils preferably include iron (such as aluminum-iron alloys); any other components may be included, within the ranges not impairing the moldability of the laminate, and within the heretofore known content ranges specified by JIB and the like.

The thickness of the metal foil is not particularly limited, but is set to be preferably 15 to 80 μm, and particularly preferably 20 to 60 μm, from the viewpoint of, for example, the moldability.

It is preferable to adopt, as the sealant film constituting the laminate of the present invention, any one of the films formed of thermoplastic resins having heat sealability such as polyethylene, polypropylene, olefin-based copolymers and polyvinyl chloride. The thickness of the sealant film is not particularly limited, but is usually preferably 20 to 80 μm and particularly preferably 30 to 60 μm.

EXAMPLES

Hereinafter, the present invention is described in detail by way of Examples. However, the present invention is not limited by following Examples at all. The properties of a polyester film and a laminate were measured by the following methods.

It is to be noted that an obtained film roll was divided widthwise into three equal parts. The central film roll was designated as "a", the film roll on the right hand-side as seen from the upstream side in the flow direction of the film was designated as "b", and the film roll on the left-hand side as seen from the upstream side in the flow direction of the film was designated as "c".

(1) Stresses at 5% Elongation and at 15% Elongation, Moduli of Elasticity, and Dry Heat Shrinkage Rates in Four Directions of Polyester Films The stresses at 5% elongation and at 15% elongation, moduli of elasticity, and dry heat shrinkage rates in four directions of a polyester film were measured and calculated by the above-described methods, with the reference direction (0° direction) taken as MD.

In this case, the measurements were performed by using the samples sampled from the film roll "a" and the film roll "b". In the film roll "a" and the film roll "b", the films sampled from the positions corresponding to halves the winding amounts were used, and the widthwise central points were each taken as the central point A shown in FIG. 1.

These values in the film roll "b" were measured only in Examples and Comparative Examples shown in Table 7.

(2) Average Thicknesses and Standard Deviations of Polyester Films

The average thicknesses and the standard deviations of the polyester films were measured and calculated by the above-described methods, respectively.

In this case, samples were collected from the film roll "a", the film roll "b", and the film roll "c", and were measured. In each of the film rolls "a" and "b", film sampled at the position corresponding to the half of the winding amount was used, and the widthwise central point of the sampled film was taken as the central point A shown in FIG. 2. In the film roll "c", a film sampled in the vicinity of the winding end was used, and the position of 20 cm from the left-hand side edge as seen from the upstream side in the flow direction of the film was taken as the central point A shown in FIG. 2.

(3) Cold Moldability

An obtained laminate was humidity-conditioned at 23° C. and 50% RH for 1 hour or more, and then the Erichsen value was determined by pressing a steel sphere punch onto the laminate with a predetermined indentation depth, on the basis of JIS Z2247, by using an Erichsen tester (No. 5755, manufactured by Yasuda Seiki Seisakusho Ltd.), at 23° C. and 50% RH. It is to be noted that the size of the laminate to be adopted as the sample was 10 cm in length and 10 cm in width, and the Erichsen values were measured at every 0.5 mm, the measurement was performed with the number of samples of 10, and the average value was calculated.

When the Erichsen value was 6.5 mm or more, in particular, 7 mm or more, the laminate was determined as suitable for deep draw molding.

As the polyester resin (R), the following polyester resins were used.

A-1: Polybutylene terephthalate (NOVADURAN 5010S, limiting viscosity: 1.10, manufactured by Mitsubishi. Engineering-Plastics Corp.)

A-2: Polybutylene terephthalate (NOVADURAN 5505S, limiting viscosity: 0.92, manufactured by Mitsubishi Engineering-Plastics Corp.)

Bh-1: Polyethylene terephthalate (UT-CBR, limiting viscosity: 0.67, manufactured by Nippon-Ester Co., Ltd.)

Bh-2: Polyethylene terephthalate (NEH2050, limiting viscosity: 0.78, manufactured by Nippon-Ester Co., Ltd.)

Bc-3: Polyethylene terephthalate copolymerized with isophthalic acid (MA-1342, limiting viscosity: 0.63, manufactured by Nippon-Ester Co., Ltd.)

Bc-4: Polyethylene terephthalate copolymerized with isophthalic acid (SA-1345, limiting viscosity: 0.78, manufactured by Nippon-Ester Co., Ltd.)

Example 1

(Preparation of Polyester Film)

As the polyester resin (R), the above-described A-1 and Bh-1 were mixed in a mass ratio (A-1/Bh-1) of 5/95, an aggregated silica master (GS-BE-MG, manufactured by Nippon-Ester Co., Ltd.) was added to the resulting mixture so as for the silica content to be 0.05% by mass, the mixture was melted at 280° C., the molten product was extruded from a T-die exit with a residence time of 5 minutes, and rapidly cooled and solidified, and thus, and an undrawn film was obtained so as for the thickness after drawing to be 25 μm.

Subsequently, the undrawn film was successively drawn. First, the undrawn film was heated to 85° C. by using a heating roll in a longitudinal drawing machine, and drawn in MD at a magnification of 3.4; successively the transverse drawing was started at 120° C., and the MD-drawn film was drawn in TD at a magnification of 4.25. In this drawing, the drawing magnification ratio ($DR_{MD}/DR_{TD}$) was 0.80, and the area magnification ($DR_{MD} \times DR_{TD}$) was 14.5.

Next, the relaxation heat treatment temperature was set at 190° C., the relaxation heat treatment was applied for 4 seconds at the TD relaxation rate set at 6.0%, then the relaxed film was cooled to room temperature, and thus a polyester film having a thickness of 25 μm was obtained. The obtained polyester film was taken up in a roll shape.

(Preparation of Laminate)

Next, a two component polyurethane based adhesive (TM-K55/CAT-10L, manufactured by Toyo-Morton, Ltd.) was applied to the obtained polyester film so as for the application quantity to be 5 g/m², and dried at 80° C. for 10 seconds. On the adhesive-applied surface, an aluminum foil (AA Standard 8079P, thickness: 50 μm) was laminated. Next, the same type of adhesive was applied under the same conditions on the aluminum foil side of the aluminum foil laminated on the polyester film, an undrawn polypropylene film (GHC, thickness: 50 μm, manufactured by Mitsui Chemicals Tohcello, Inc.) was laminated on the applied adhesive layer, and subjected to an aging treatment for 72 hours in an atmosphere set at 40° C., and thus a laminate was prepared.

Examples 2 to 67 and Comparative Examples 1 to 34

Polyester films were obtained in the same manner as in Example 1 except that the type and the mass ratio of the polyester resins used as the polyester resin (R), the drawing magnifications in MD and TD, the drawing temperature, the relaxation heat treatment temperature, the relaxation rate and the thickness after drawing were altered as described in Table 1 to Table 7. When the thickness after drawing was altered, the thickness alteration was performed by altering the feed rate of the Polyester resin (R) extruded from the T-die exit.

By using the obtained polyester films, laminates were obtained in the same manner as in Example 1.

Tables 1 to 7 show the constitutions, production conditions and property values of the polyester films obtained in Examples 1 to 67 and Comparative Examples 1 to 34, and the cold moldabilities of the laminates obtained in Examples 3 to 67 and Comparative Examples to 34.

TABLE 1

| | | | Polyester resin (R) | | | Production conditions | | | | | |
|---|---|---|---|---|---|---|---|---|---|---|---|
| | | | Constitution | | Property | Longitudinal direction (MD) | | Transverse direction (TD) | | | |
| | | | | | value | | | Drawing | | Heat treatment | |
| | | | | | | Drawing | | | | | Relaxation |
| | | Resin (A) | Resin (B) | (A)/(B) or (Bc)/(Bh) (mass ratio) | Limiting viscosity | Temperature ° C. | Magnification ($DR_{MD}$) | Temperature ° C. | Magnification ($DR_{TD}$) | Temperature ° C. | rate % |
| Examples | 1 | A-1 | Bh-1 | 5/95 | 0.69 | 85 | 3.4 | 120 | 4.25 | 190 | 6.0 |
| | 2 | A-1 | Bh-1 | 10/90 | 0.71 | 85 | 3.4 | 120 | 4.25 | 190 | 6.0 |
| | 3 | A-1 | Bh-1 | 20/80 | 0.75 | 85 | 3.4 | 120 | 4.25 | 190 | 6.0 |
| | 4 | A-1 | Bh-1 | 30/70 | 0.80 | 85 | 3.4 | 120 | 4.25 | 190 | 6.0 |
| | 5 | A-1 | Bh-1 | 40/60 | 0.84 | 85 | 3.4 | 120 | 4.25 | 190 | 6.0 |
| | 6 | A-1 | Bh-1 | 50/50 | 0.88 | 85 | 3.4 | 120 | 4.25 | 190 | 6.0 |
| | 7 | A-1 | Bh-1 | 2/98 | 0.67 | 85 | 3.4 | 120 | 4.25 | 190 | 6.0 |
| | 8 | — | Bh-1 | 0/100 | 0.67 | 85 | 3.4 | 120 | 4.25 | 190 | 6.0 |
| | 9 | A-1 | Bh-1 | 10/90 | 0.71 | 80 | 3.4 | 130 | 4.35 | 190 | 6.0 |
| | 10 | A-1 | Bh-1 | 10/90 | 0.71 | 80 | 3.3 | 110 | 4.25 | 180 | 5.0 |
| | 11 | A-1 | Bh-1 | 10/90 | 0.71 | 100 | 3.3 | 130 | 4.15 | 200 | 6.0 |
| | 12 | A-1 | Bh-1 | 10/90 | 0.71 | 90 | 3.4 | 110 | 4.25 | 210 | 5.0 |
| | 13 | A-1 | Bh-1 | 10/90 | 0.71 | 75 | 3.4 | 110 | 4.35 | 180 | 4.0 |
| | 14 | A-1 | Bh-1 | 10/90 | 0.71 | 95 | 3.0 | 110 | 4.30 | 180 | 6.0 |
| | 15 | A-1 | Bh-1 | 10/90 | 0.71 | 70 | 3.5 | 130 | 3.90 | 190 | 6.0 |
| | 16 | A-1 | Bh-1 | 10/90 | 0.71 | 70 | 3.1 | 140 | 4.05 | 190 | 6.0 |
| | 17 | A-1 | Bh-1 | 10/90 | 0.71 | 70 | 3.6 | 100 | 4.00 | 190 | 6.0 |
| | 18 | A-1 | Bh-1 | 10/90 | 0.71 | 75 | 3.0 | 150 | 4.15 | 180 | 6.0 |
| | 19 | A-1 | Bh-1 | 10/90 | 0.71 | 65 | 3.7 | 140 | 4.20 | 190 | 6.0 |
| | 20 | A-1 | Bh-1 | 10/90 | 0.71 | 85 | 3.4 | 120 | 4.25 | 150 | 6.0 |
| | 21 | A-1 | Bh-1 | 10/90 | 0.71 | 85 | 3.4 | 120 | 4.25 | 215 | 6.0 |
| | 22 | A-1 | Bh-1 | 10/90 | 0.71 | 80 | 3.4 | 130 | 4.35 | 190 | 6.0 |
| | 23 | A-1 | Bh-1 | 10/90 | 0.71 | 80 | 3.3 | 110 | 4.25 | 180 | 5.0 |
| | 24 | A-1 | Bh-1 | 10/90 | 0.71 | 100 | 3.3 | 130 | 4.15 | 200 | 6.0 |
| | 25 | A-1 | Bh-1 | 10/90 | 0.71 | 90 | 3.4 | 110 | 4.25 | 210 | 5.0 |
| | 26 | A-1 | Bh-1 | 10/90 | 0.71 | 75 | 3.4 | 110 | 4.35 | 180 | 4.0 |
| | 27 | A-1 | Bh-1 | 10/90 | 0.71 | 95 | 3.0 | 110 | 4.30 | 180 | 6.0 |
| | 28 | A-1 | Bh-1 | 10/90 | 0.71 | 70 | 3.5 | 130 | 3.90 | 190 | 6.0 |
| | 29 | A-1 | Bh-1 | 10/90 | 0.71 | 70 | 3.1 | 140 | 4.05 | 190 | 6.0 |
| | 30 | A-1 | Bh-1 | 10/90 | 0.71 | 70 | 3.6 | 100 | 4.00 | 190 | 6.0 |
| | 31 | A-1 | Bh-1 | 10/90 | 0.71 | 75 | 3.0 | 150 | 4.15 | 180 | 6.0 |
| | 32 | A-1 | Bh-1 | 10/90 | 0.71 | 65 | 3.7 | 140 | 4.20 | 190 | 6.0 |

TABLE 1-continued

|  |  | Production conditions | | Property values of polyester film | | | | | |
|---|---|---|---|---|---|---|---|---|---|
|  |  | Drawing magnification | | Thicknesses (μm) | | | | | |
|  |  | | | Film roll "a" | | Film roll "b" | | Film roll "c" | |
|  |  | ratio ($DR_{MD}/DR_{TD}$) | Area magnification ($DR_{MD} \times DR_{TD}$) | Average value | Standard deviation | Average value | Standard deviation | Average value | Standard deviation |
| Examples | 1 | 0.80 | 14.5 | 24.9 | 0.23 | 24.8 | 0.28 | 25.1 | 0.27 |
|  | 2 | 0.80 | 14.5 | 24.6 | 0.22 | 24.8 | 0.27 | 25.3 | 0.26 |
|  | 3 | 0.80 | 14.5 | 24.8 | 0.30 | 24.7 | 0.24 | 24.8 | 0.29 |
|  | 4 | 0.80 | 14.5 | 25.0 | 0.29 | 24.8 | 0.22 | 24.8 | 0.24 |
|  | 5 | 0.80 | 14.5 | 25.1 | 0.25 | 25.0 | 0.23 | 25.0 | 0.26 |
|  | 6 | 0.80 | 14.5 | 24.9 | 0.26 | 24.9 | 0.26 | 24.8 | 0.27 |
|  | 7 | 0.80 | 14.5 | 25.3 | 0.22 | 24.9 | 0.26 | 25.0 | 0.30 |
|  | 8 | 0.80 | 14.5 | 24.7 | 0.21 | 25.0 | 0.28 | 25.1 | 0.29 |
|  | 9 | 0.78 | 14.8 | 25.1 | 0.25 | 25.2 | 0.24 | 25.3 | 0.27 |
|  | 10 | 0.78 | 14.0 | 25.2 | 0.23 | 25.1 | 0.23 | 25.1 | 0.24 |
|  | 11 | 0.80 | 13.7 | 25.1 | 0.30 | 24.8 | 0.29 | 25.1 | 0.31 |
|  | 12 | 0.80 | 14.5 | 25.9 | 0.24 | 24.9 | 0.26 | 25.0 | 0.27 |
|  | 13 | 0.78 | 14.8 | 24.8 | 0.31 | 24.8 | 0.29 | 24.7 | 0.32 |
|  | 14 | 0.70 | 12.9 | 25.0 | 0.30 | 25.2 | 0.31 | 25.1 | 0.32 |
|  | 15 | 0.90 | 13.7 | 24.8 | 0.29 | 25.0 | 0.28 | 25.0 | 0.29 |
|  | 16 | 0.77 | 12.6 | 24.9 | 0.31 | 25.0 | 0.32 | 25.0 | 0.32 |
|  | 17 | 0.90 | 14.4 | 25.0 | 0.29 | 24.8 | 0.30 | 24.8 | 0.30 |
|  | 18 | 0.72 | 12.5 | 24.9 | 0.33 | 25.1 | 0.31 | 25.1 | 0.33 |
|  | 19 | 0.88 | 15.5 | 24.8 | 0.31 | 25.0 | 0.32 | 25.0 | 0.31 |
|  | 20 | 0.80 | 14.5 | 24.9 | 0.27 | 25.1 | 0.27 | 25.1 | 0.25 |
|  | 21 | 0.80 | 14.5 | 24.9 | 0.26 | 25.3 | 0.26 | 25.3 | 0.24 |
|  | 22 | 0.78 | 14.8 | 15.1 | 0.29 | 14.9 | 0.29 | 15.0 | 0.30 |
|  | 23 | 0.78 | 14.0 | 15.0 | 0.31 | 14.9 | 0.30 | 14.9 | 0.32 |
|  | 24 | 0.80 | 13.7 | 15.2 | 0.31 | 15.1 | 0.32 | 15.2 | 0.33 |
|  | 25 | 0.80 | 14.5 | 14.9 | 0.28 | 14.8 | 0.29 | 14.9 | 0.29 |
|  | 26 | 0.78 | 14.8 | 14.9 | 0.29 | 14.9 | 0.31 | 15.0 | 0.31 |
|  | 27 | 0.70 | 12.9 | 15.1 | 0.34 | 15.0 | 0.33 | 15.1 | 0.33 |
|  | 28 | 0.90 | 13.7 | 15.0 | 0.32 | 14.9 | 0.32 | 14.9 | 0.33 |
|  | 29 | 0.77 | 12.6 | 15.2 | 0.34 | 15.0 | 0.33 | 15.1 | 0.34 |
|  | 30 | 0.90 | 14.4 | 15.1 | 0.33 | 14.9 | 0.32 | 14.9 | 0.33 |
|  | 31 | 0.72 | 12.5 | 15.0 | 0.34 | 15.1 | 0.34 | 15.0 | 0.35 |
|  | 32 | 0.88 | 15.5 | 14.8 | 0.32 | 14.9 | 0.33 | 15.1 | 0.31 |

TABLE 2

|  |  |  | Property values of polyester film | | | | | | | | |
|---|---|---|---|---|---|---|---|---|---|---|---|
|  |  |  | Stresses (MPa) | | | | | | | | |
|  |  |  | At 5% elongation (F5) | | | | | At 15% elongation (F15) | | | | |
|  |  | Film roll | 0° (MD) | 45° | 90° (TD) | 135° | Maximum value − minimum value (ΔF5) | 0° (MD) | 45° | 90° (TD) | 135° | Maximum value − minimum value (ΔF15) |
| Examples | 1 | "a" | 100.0 | 97.8 | 101.7 | 99.6 | 3.9 | 122.5 | 113.7 | 128.8 | 117.8 | 15.1 |
|  | 2 | "a" | 98.3 | 97.1 | 102.6 | 97.3 | 5.5 | 116.6 | 115.9 | 128.4 | 116.8 | 12.5 |
|  | 3 | "a" | 96.6 | 92.1 | 99.7 | 92.0 | 7.7 | 111.9 | 109.7 | 117.4 | 106.0 | 11.4 |
|  | 4 | "a" | 94.8 | 91.9 | 94.1 | 93.8 | 2.9 | 109.4 | 102.2 | 113.1 | 107.3 | 10.9 |
|  | 5 | "a" | 93.2 | 90.1 | 93.4 | 91.9 | 3.3 | 107.0 | 99.5 | 111.7 | 102.7 | 12.2 |
|  | 6 | "a" | 86.9 | 81.8 | 92.0 | 84.6 | 10.2 | 100.7 | 92.4 | 105.5 | 97.0 | 13.1 |
|  | 7 | "a" | 104.2 | 97.3 | 109.0 | 97.8 | 11.7 | 119.8 | 111.9 | 132.9 | 114.9 | 21.0 |
|  | 8 | "a" | 108.8 | 98.1 | 112.9 | 100.5 | 14.8 | 126.3 | 115.6 | 136.7 | 117.3 | 21.1 |
|  | 9 | "a" | 99.1 | 96.9 | 102.9 | 99.7 | 5.0 | 114.7 | 115.9 | 126.5 | 116.4 | 11.8 |
|  | 10 | "a" | 99.7 | 100.1 | 105.5 | 102.4 | 5.8 | 113.5 | 115.1 | 125.1 | 120.5 | 11.6 |
|  | 11 | "a" | 95.1 | 92.4 | 94.7 | 94.8 | 2.7 | 108.7 | 102.5 | 110.2 | 108.3 | 7.7 |
|  | 12 | "a" | 99.1 | 98.7 | 108.9 | 100.8 | 10.2 | 117.2 | 116.8 | 126.7 | 119.8 | 9.9 |
|  | 13 | "a" | 100.2 | 98.2 | 107.0 | 100.8 | 8.8 | 117.6 | 118.7 | 134.1 | 117.7 | 16.5 |
|  | 14 | "a" | 93.6 | 97.2 | 105.4 | 98.1 | 11.8 | 104.8 | 113.1 | 124.7 | 111.7 | 19.9 |
|  | 15 | "a" | 103.2 | 97.1 | 91.1 | 95.6 | 12.1 | 122.9 | 109.8 | 107.9 | 108.9 | 15.0 |
|  | 16 | "a" | 101.7 | 93.7 | 96.0 | 92.7 | 9.0 | 114.3 | 107.0 | 121.6 | 111.2 | 14.6 |
|  | 17 | "a" | 106.4 | 99.9 | 99.3 | 102.5 | 7.1 | 127.2 | 116.7 | 114.9 | 120.1 | 12.3 |
|  | 18 | "a" | 99.8 | 95.4 | 90.7 | 96.4 | 9.1 | 117.9 | 110.5 | 102.2 | 109.7 | 15.7 |
|  | 19 | "a" | 113.4 | 102.4 | 99.7 | 103.1 | 13.7 | 140.2 | 124.3 | 120.7 | 123.8 | 19.5 |
|  | 20 | "a" | 94.9 | 95.9 | 100.7 | 95.4 | 5.8 | 115.1 | 113.8 | 125.9 | 114.9 | 12.1 |
|  | 21 | "a" | 103.4 | 100.4 | 111.2 | 101.4 | 10.8 | 120.2 | 119.6 | 138.9 | 121.7 | 19.3 |
|  | 22 | "a" | 103.2 | 97.2 | 104.3 | 99.8 | 7.1 | 117.3 | 118.1 | 130.1 | 117.1 | 13.0 |
|  | 23 | "a" | 98.3 | 101.8 | 105.9 | 100.8 | 7.6 | 114.3 | 118.9 | 123.7 | 119.0 | 9.4 |

TABLE 2-continued

| | | | | | | | | | | | |
|---|---|---|---|---|---|---|---|---|---|---|---|
| 24 | "a" | 99.1 | 93.8 | 96.8 | 94.5 | 5.3 | 112.1 | 101.9 | 113.1 | 108.4 | 11.2 |
| 25 | "a" | 101.2 | 100.1 | 112.2 | 99.3 | 12.9 | 119.5 | 116.7 | 129.1 | 123.1 | 12.4 |
| 26 | "a" | 99.7 | 99.3 | 106.9 | 100.1 | 7.6 | 116.8 | 117.3 | 132.8 | 114.1 | 18.7 |
| 27 | "a" | 94.3 | 97.5 | 106.6 | 97.2 | 12.3 | 105.9 | 117.1 | 126.6 | 110.1 | 20.7 |
| 28 | "a" | 105.6 | 99.3 | 92.8 | 96.8 | 12.8 | 124.8 | 111.2 | 109.7 | 111.0 | 15.1 |
| 29 | "a" | 103.4 | 95.1 | 94.8 | 92.3 | 11.1 | 115.4 | 107.3 | 123.8 | 110.4 | 16.5 |
| 30 | "a" | 104.8 | 101.8 | 99.1 | 105.1 | 6.0 | 129.1 | 114.9 | 115.7 | 123.4 | 14.2 |
| 31 | "a" | 98.9 | 96.9 | 91.7 | 95.5 | 7.2 | 118.1 | 112.4 | 103.4 | 108.1 | 14.7 |
| 32 | "a" | 114.1 | 103.8 | 100.3 | 101.1 | 13.8 | 139.1 | 126.1 | 121.0 | 124.9 | 18.1 |

| | | Property values of polyester film | | | | | | | |
|---|---|---|---|---|---|---|---|---|---|
| | | Moduli of elasticity (GPa) | | | | Dry heat shrinkage rates (%) | | | | Laminate Cold moldability |
| | | 0° (MD) | 45° | 90° (TD) | 135° | 0° (MD) | 45° | 90° (TD) | 135° | Erichsen value mm |
| Examples | 1 | 2.9 | 2.7 | 3.0 | 2.8 | 4.9 | 4.0 | 3.1 | 4.1 | 9.7 |
| | 2 | 2.8 | 2.7 | 2.9 | 2.8 | 5.1 | 4.1 | 3.3 | 4.0 | 9.5 |
| | 3 | 2.6 | 2.7 | 2.9 | 2.7 | 5.1 | 4.2 | 3.1 | 4.0 | 9.5 |
| | 4 | 2.5 | 2.5 | 2.8 | 2.6 | 5.0 | 4.2 | 3.2 | 4.2 | 9.3 |
| | 5 | 2.5 | 2.5 | 2.7 | 2.5 | 5.2 | 4.3 | 3.3 | 4.2 | 9.1 |
| | 6 | 2.5 | 2.5 | 2.7 | 2.5 | 5.1 | 4.1 | 3.2 | 3.9 | 8.9 |
| | 7 | 3.0 | 2.8 | 3.1 | 2.8 | 5.1 | 4.2 | 3.1 | 4.3 | 8.6 |
| | 8 | 3.1 | 2.9 | 3.2 | 3.1 | 5.1 | 4.2 | 3.2 | 4.1 | 8.5 |
| | 9 | 2.9 | 2.6 | 3.1 | 3.0 | 5.2 | 4.0 | 3.1 | 4.3 | 9.3 |
| | 10 | 2.8 | 2.7 | 3.0 | 2.7 | 6.2 | 5.7 | 5.2 | 5.5 | 9.4 |
| | 11 | 3.1 | 3.0 | 3.1 | 3.0 | 3.8 | 2.0 | 1.2 | 2.2 | 9.5 |
| | 12 | 3.3 | 3.2 | 3.4 | 3.2 | 2.7 | 1.3 | 0.2 | 1.3 | 9.2 |
| | 13 | 3.1 | 2.9 | 2.9 | 3.0 | 6.1 | 6.0 | 5.8 | 6.0 | 9.1 |
| | 14 | 2.7 | 2.9 | 3.2 | 2.8 | 6.2 | 5.7 | 4.9 | 5.8 | 8.7 |
| | 15 | 3.0 | 2.8 | 2.8 | 2.9 | 5.2 | 4.2 | 3.2 | 4.4 | 8.6 |
| | 16 | 2.8 | 2.7 | 2.7 | 2.6 | 5.0 | 4.0 | 3.4 | 4.1 | 8.8 |
| | 17 | 3.0 | 2.7 | 2.8 | 2.8 | 4.9 | 3.9 | 3.2 | 3.3 | 8.9 |
| | 18 | 2.9 | 2.8 | 2.8 | 2.7 | 6.3 | 5.4 | 4.6 | 5.3 | 8.8 |
| | 19 | 3.3 | 2.9 | 2.8 | 3.0 | 5.3 | 4.1 | 3.2 | 4.2 | 8.5 |
| | 20 | 2.6 | 2.5 | 2.3 | 2.4 | 13.4 | 14.7 | 16.7 | 14.9 | 7.8 |
| | 21 | 3.2 | 3.1 | 3.3 | 3.2 | 2.5 | 1.1 | −0.1 | 1.0 | 7.1 |
| | 22 | 3.0 | 2.7 | 3.0 | 2.9 | 5.3 | 4.1 | 3.0 | 4.4 | 9.0 |
| | 23 | 2.9 | 2.8 | 3.0 | 2.7 | 6.2 | 5.8 | 5.3 | 5.5 | 9.0 |
| | 24 | 3.1 | 3.0 | 2.9 | 2.8 | 3.9 | 2.1 | 1.2 | 2.3 | 9.3 |
| | 25 | 3.2 | 3.1 | 3.4 | 3.1 | 2.7 | 1.4 | 0.2 | 1.4 | 9.0 |
| | 26 | 2.9 | 2.8 | 2.8 | 3.0 | 6.2 | 6.0 | 5.7 | 6.0 | 8.8 |
| | 27 | 2.8 | 2.9 | 3.1 | 2.8 | 6.2 | 5.8 | 4.8 | 5.7 | 8.4 |
| | 28 | 3.0 | 2.7 | 2.9 | 2.8 | 5.1 | 4.0 | 3.0 | 4.2 | 8.3 |
| | 29 | 2.8 | 2.7 | 2.7 | 2.8 | 5.1 | 5.1 | 3.4 | 4.0 | 8.4 |
| | 30 | 3.0 | 2.6 | 2.7 | 2.8 | 4.8 | 3.8 | 3.0 | 3.1 | 8.6 |
| | 31 | 3.0 | 2.9 | 2.7 | 2.7 | 6.5 | 5.5 | 4.7 | 5.5 | 8.4 |
| | 32 | 3.2 | 2.7 | 2.8 | 3.0 | 5.4 | 4.2 | 3.2 | 4.2 | 8.2 |

TABLE 3

| | | Polyester resin (R) | | | Production conditions | | | | | |
|---|---|---|---|---|---|---|---|---|---|---|
| | | Constitution | | Property value | Longitudinal direction (MD) | | Transverse direction (TD) | | Heat treatment | |
| | | | | | Drawing | | Drawing | | | Relaxation |
| | | Resin (A) | Resin (A) | (A)/(B) or (Bc)/(Bh) (mass ratio) | Limiting viscosity | Temperature °C. | Magnification (DR$_{MD}$) | Temperature °C. | Magnification (DR$_{TD}$) | Temperature °C. | rate % |
| Examples | 33 | A-2 | Bh-1 | 5/95 | 0.68 | 90 | 3.5 | 130 | 4.15 | 170 | 6.0 |
| | 34 | A-2 | Bh-1 | 10/90 | 0.69 | 90 | 3.5 | 130 | 4.15 | 170 | 6.0 |
| | 35 | A-2 | Bh-1 | 20/80 | 0.72 | 90 | 3.5 | 130 | 4.15 | 170 | 6.0 |
| | 36 | A-2 | Bh-1 | 30/70 | 0.74 | 90 | 3.5 | 130 | 4.15 | 170 | 6.0 |
| | 37 | A-2 | Bh-1 | 40/60 | 0.77 | 90 | 3.5 | 130 | 4.15 | 170 | 6.0 |
| | 38 | A-2 | Bh-1 | 10/90 | 0.69 | 95 | 3.5 | 120 | 4.25 | 170 | 5.0 |
| | 39 | A-2 | Bh-1 | 10/90 | 0.69 | 75 | 3.2 | 110 | 4.35 | 160 | 6.0 |
| | 40 | A-2 | Bh-1 | 10/90 | 0.69 | 95 | 3.0 | 110 | 4.30 | 180 | 6.0 |
| | 41 | A-2 | Bh-1 | 10/90 | 0.69 | 70 | 3.5 | 130 | 3.90 | 190 | 6.0 |
| | 42 | A-2 | Bh-1 | 10/90 | 0.69 | 75 | 3.0 | 150 | 4.15 | 180 | 6.0 |
| | 43 | A-2 | Bh-1 | 10/90 | 0.69 | 65 | 3.7 | 140 | 4.20 | 190 | 6.0 |
| | 44 | A-2 | Bh-1 | 10/90 | 0.69 | 90 | 3.5 | 130 | 4.15 | 150 | 6.0 |
| | 45 | A-2 | Bh-1 | 10/90 | 0.69 | 90 | 3.5 | 130 | 4.15 | 215 | 6.0 |

TABLE 3-continued

| 46 | A-2 | Bh-1 | 5/95 | 0.68 | 90 | 3.5 | 130 | 4.15 | 170 | 6.0 |
|---|---|---|---|---|---|---|---|---|---|---|
| 47 | A-2 | Bh-1 | 10/90 | 0.69 | 90 | 3.5 | 130 | 4.15 | 170 | 6.0 |
| 48 | A-2 | Bh-1 | 20/80 | 0.72 | 90 | 3.5 | 130 | 4.15 | 170 | 6.0 |
| 49 | A-2 | Bh-1 | 30/70 | 0.74 | 90 | 3.5 | 130 | 4.15 | 170 | 6.0 |
| 50 | A-2 | Bh-1 | 40/60 | 0.77 | 90 | 3.5 | 130 | 4.15 | 170 | 6.0 |
| 51 | A-2 | Bh-1 | 10/90 | 0.69 | 95 | 3.5 | 120 | 4.25 | 170 | 5.0 |
| 52 | A-2 | Bh-1 | 10/90 | 0.69 | 75 | 3.2 | 110 | 4.35 | 160 | 6.0 |
| 53 | A-2 | Bh-1 | 10/90 | 0.69 | 95 | 3.0 | 110 | 4.30 | 180 | 6.0 |
| 54 | A-2 | Bh-1 | 10/90 | 0.69 | 70 | 3.5 | 130 | 3.90 | 190 | 6.0 |
| 55 | A-2 | Bh-1 | 10/90 | 0.69 | 75 | 3.0 | 150 | 4.15 | 180 | 6.0 |
| 56 | A-2 | Bh-1 | 10/90 | 0.69 | 65 | 3.7 | 140 | 4.20 | 190 | 6.0 |
| 57 | — | Bc-3/Bh-1 | 5/95 | 0.67 | 80 | 3.2 | 100 | 4.00 | 180 | 5.0 |
| 58 | — | Bc-3/Bh-1 | 10/90 | 0.67 | 90 | 3.1 | 120 | 4.20 | 180 | 6.0 |
| 59 | — | Bc-3/Bh-1 | 20/80 | 0.66 | 100 | 3.5 | 150 | 4.40 | 170 | 6.0 |
| 60 | — | Bc-3/Bh-1 | 10/90 | 0.67 | 80 | 3.2 | 100 | 4.00 | 180 | 5.0 |
| 61 | — | Bc-3/Bh-1 | 10/90 | 0.67 | 100 | 3.5 | 150 | 4.40 | 170 | 6.0 |
| 62 | — | Bc-4/Bh-2 | 5/95 | 0.78 | 80 | 3.4 | 110 | 4.00 | 170 | 6.0 |
| 63 | — | Bc-4/Bh-2 | 10/90 | 0.78 | 75 | 3.3 | 160 | 4.40 | 200 | 5.0 |
| 64 | A-2 | Bh-2 | 5/95 | 0.78 | 95 | 3.4 | 120 | 4.25 | 190 | 4.0 |
| 65 | A-2 | Bh-2 | 10/90 | 0.79 | 85 | 3.5 | 100 | 4.40 | 190 | 5.0 |
| 66 | A-1 | Bh-2 | 5/95 | 0.79 | 75 | 3.0 | 130 | 4.15 | 170 | 5.0 |
| 67 | A-1 | Bh-2 | 10/90 | 0.81 | 90 | 3.0 | 110 | 4.30 | 160 | 5.0 |

| | | Production conditions | | Property values of polyester film | | | | | |
|---|---|---|---|---|---|---|---|---|---|
| | | Drawing magnification | | Thicknesses (μm) | | | | | |
| | | | | Film roll "a" | | Film roll "b" | | Film roll "c" | |
| | | ratio ($DR_{MD}/DR_{TD}$) | Area magnification ($DR_{MD} \times DR_{TD}$) | Average value | Standard deviation | Average value | Standard deviation | Average value | Standard deviation |
| Examples | 33 | 0.84 | 14.5 | 24.8 | 0.27 | 25.1 | 0.24 | 25.0 | 0.24 |
| | 34 | 0.84 | 14.5 | 24.6 | 0.29 | 25.0 | 0.27 | 24.9 | 0.25 |
| | 35 | 0.84 | 14.5 | 25.1 | 0.23 | 24.7 | 0.24 | 24.9 | 0.25 |
| | 36 | 0.84 | 14.5 | 24.9 | 0.27 | 24.8 | 0.24 | 24.8 | 0.24 |
| | 37 | 0.84 | 14.5 | 25.1 | 0.26 | 24.9 | 0.26 | 24.9 | 0.24 |
| | 38 | 0.82 | 14.9 | 25.3 | 0.28 | 25.1 | 0.27 | 25.1 | 0.28 |
| | 39 | 0.74 | 13.9 | 25.2 | 0.29 | 25.0 | 0.31 | 25.0 | 0.33 |
| | 40 | 0.70 | 12.9 | 25.1 | 0.29 | 25.2 | 0.30 | 25.1 | 0.31 |
| | 41 | 0.90 | 13.7 | 25.2 | 0.28 | 25.2 | 0.30 | 25.3 | 0.32 |
| | 42 | 0.72 | 12.5 | 25.3 | 0.31 | 25.1 | 0.32 | 25.1 | 0.30 |
| | 43 | 0.88 | 15.5 | 25.0 | 0.30 | 25.0 | 0.31 | 24.9 | 0.31 |
| | 44 | 0.84 | 14.5 | 25.1 | 0.26 | 25.2 | 0.27 | 25.1 | 0.26 |
| | 45 | 0.84 | 14.5 | 25.1 | 0.26 | 25.0 | 0.25 | 25.1 | 0.25 |
| | 46 | 0.84 | 14.5 | 10.2 | 0.33 | 10.1 | 0.34 | 10.1 | 0.34 |
| | 47 | 0.84 | 14.5 | 10.0 | 0.32 | 10.1 | 0.33 | 10.1 | 0.33 |
| | 48 | 0.84 | 14.5 | 10.3 | 0.33 | 10.2 | 0.32 | 10.2 | 0.33 |
| | 49 | 0.84 | 14.5 | 10.1 | 0.34 | 10.0 | 0.35 | 10.0 | 0.34 |
| | 50 | 0.84 | 14.5 | 9.8 | 0.33 | 9.9 | 0.32 | 9.9 | 0.33 |
| | 51 | 0.82 | 14.9 | 9.9 | 0.34 | 9.9 | 0.35 | 10.0 | 0.34 |
| | 52 | 0.74 | 13.9 | 10.0 | 0.34 | 9.9 | 0.33 | 9.9 | 0.35 |
| | 53 | 0.70 | 12.9 | 10.1 | 0.36 | 10.0 | 0.35 | 10.0 | 0.36 |
| | 54 | 0.90 | 13.7 | 10.2 | 0.34 | 10.1 | 0.33 | 10.0 | 0.34 |
| | 55 | 0.72 | 12.5 | 10.3 | 0.37 | 10.1 | 0.37 | 10.1 | 0.36 |
| | 56 | 0.88 | 15.5 | 9.9 | 0.34 | 10.1 | 0.34 | 9.9 | 0.35 |
| | 57 | 0.80 | 12.8 | 25.1 | 0.24 | 25.4 | 0.26 | 25.3 | 0.26 |
| | 58 | 0.74 | 13.0 | 25.2 | 0.27 | 25.3 | 0.28 | 25.4 | 0.23 |
| | 59 | 0.80 | 15.4 | 24.8 | 0.30 | 25.1 | 0.30 | 25.1 | 0.24 |
| | 60 | 0.80 | 12.8 | 24.9 | 0.28 | 24.8 | 0.28 | 24.7 | 0.26 |
| | 61 | 0.80 | 15.4 | 24.7 | 0.32 | 24.8 | 0.34 | 25.1 | 0.31 |
| | 62 | 0.85 | 13.6 | 24.7 | 0.28 | 24.6 | 0.24 | 24.6 | 0.29 |
| | 63 | 0.75 | 14.5 | 25.4 | 0.24 | 25.3 | 0.23 | 25.2 | 0.27 |
| | 64 | 0.80 | 14.5 | 25.3 | 0.24 | 25.1 | 0.22 | 25.2 | 0.31 |
| | 65 | 0.80 | 15.4 | 25.1 | 0.26 | 25.1 | 0.28 | 25.1 | 0.34 |
| | 66 | 0.72 | 12.5 | 25.0 | 0.31 | 24.7 | 0.29 | 24.8 | 0.31 |
| | 67 | 0.70 | 12.9 | 24.8 | 0.32 | 24.9 | 0.27 | 25.0 | 0.32 |

TABLE 4

Property values of polyester film

| | | | Stresses (MPa) | | | | | | | | | |
|---|---|---|---|---|---|---|---|---|---|---|---|---|
| | | | At 5% elongation (F5) | | | | | At 15% elongation (F15) | | | | |
| | | Film roll | 0° (MD) | 45° | 90° (TD) | 135° | Maximum value − minimum value (ΔF5) | 0° (MD) | 45° | 90° (TD) | 135° | Maximum value − minimum value (ΔF15) |
| Examples | 33 | "a" | 104.2 | 103.7 | 99.5 | 105.1 | 5.6 | 127.4 | 119.9 | 121.3 | 118.5 | 8.9 |
| | 34 | "a" | 104.1 | 98.3 | 95.7 | 99.7 | 8.4 | 118.7 | 116.1 | 117.1 | 114.3 | 4.4 |
| | 35 | "a" | 97.2 | 96.1 | 90.6 | 91.8 | 6.6 | 110.1 | 109.8 | 105.4 | 110.9 | 5.5 |
| | 36 | "a" | 95.1 | 92.1 | 95.3 | 93.2 | 3.2 | 109.1 | 103.4 | 104.2 | 108.1 | 5.7 |
| | 37 | "a" | 94.2 | 90.4 | 91.4 | 91.2 | 3.8 | 106.9 | 102.4 | 111.0 | 103.4 | 8.6 |
| | 38 | "a" | 99.8 | 97.2 | 104.1 | 101.7 | 6.9 | 115.9 | 114.1 | 124.9 | 115.9 | 10.8 |
| | 39 | "a" | 104.3 | 104.2 | 111.6 | 103.4 | 8.2 | 123.4 | 125.1 | 137.2 | 122.0 | 15.2 |
| | 40 | "a" | 94.6 | 99.1 | 105.3 | 99.0 | 10.7 | 105.4 | 114.1 | 124.1 | 110.9 | 18.7 |
| | 41 | "a" | 102.9 | 97.0 | 90.2 | 94.9 | 12.7 | 123.4 | 108.8 | 107.5 | 108.6 | 15.9 |
| | 42 | "a" | 100.6 | 94.2 | 91.3 | 97.5 | 9.3 | 118.1 | 107.9 | 104.8 | 108.8 | 13.3 |
| | 43 | "a" | 108.7 | 103.1 | 100.2 | 101.8 | 8.5 | 134.8 | 124.6 | 119.6 | 124.3 | 15.2 |
| | 44 | "a" | 100.2 | 95.3 | 92.7 | 96.4 | 7.5 | 115.4 | 109.7 | 113.1 | 115.3 | 5.7 |
| | 45 | "a" | 108.2 | 100.2 | 97.9 | 101.3 | 10.3 | 128.9 | 117.3 | 122.1 | 120.3 | 11.6 |
| | 46 | "a" | 103.3 | 105.1 | 100.3 | 109.3 | 9.0 | 129.1 | 121.6 | 123.7 | 119.3 | 9.8 |
| | 47 | "a" | 105.3 | 99.7 | 97.3 | 100.8 | 8.0 | 119.4 | 116.2 | 117.9 | 114.6 | 4.8 |
| | 48 | "a" | 100.8 | 99.1 | 90.8 | 93.7 | 10.0 | 113.1 | 108.9 | 107.3 | 108.3 | 5.8 |
| | 49 | "a" | 94.4 | 91.3 | 97.3 | 94.8 | 6.0 | 108.3 | 102.0 | 101.1 | 106.1 | 7.2 |
| | 50 | "a" | 94.8 | 91.4 | 92.4 | 93.1 | 3.4 | 105.7 | 101.0 | 112.1 | 105.1 | 11.1 |
| | 51 | "a" | 101.8 | 99.3 | 106.3 | 103.1 | 7.0 | 118.8 | 117.3 | 126.1 | 118.7 | 8.8 |
| | 52 | "a" | 106.8 | 105.7 | 113.1 | 105.1 | 8.0 | 126.4 | 124.1 | 139.9 | 124.9 | 15.8 |
| | 53 | "a" | 94.4 | 97.9 | 105.1 | 98.3 | 10.7 | 104.7 | 113.3 | 122.8 | 112.1 | 18.1 |
| | 54 | "a" | 101.1 | 98.3 | 93.4 | 95.3 | 7.7 | 121.3 | 107.4 | 105.9 | 107.1 | 15.4 |
| | 55 | "a" | 100.8 | 97.3 | 93.4 | 98.9 | 7.4 | 116.9 | 105.9 | 102.7 | 106.9 | 14.2 |
| | 56 | "a" | 109.7 | 102.9 | 99.8 | 103.1 | 9.9 | 136.7 | 124.4 | 119.9 | 175.9 | 16.8 |
| | 57 | "a" | 95.4 | 94.1 | 98.0 | 92.4 | 5.6 | 110.4 | 113.5 | 122.2 | 117.1 | 11.8 |
| | 58 | "a" | 90.5 | 92.1 | 98.6 | 94.2 | 8.1 | 108.3 | 114.1 | 120.4 | 113.0 | 12.1 |
| | 59 | "a" | 82.1 | 80.8 | 86.1 | 83.6 | 5.3 | 97.1 | 96.2 | 114.2 | 94.5 | 19.7 |
| | 60 | "a" | 93.2 | 92.3 | 97.1 | 93.2 | 4.8 | 112.3 | 110.2 | 119.2 | 115.6 | 9.0 |
| | 61 | "a" | 94.1 | 94.0 | 103.7 | 95.2 | 9.7 | 121.8 | 122.9 | 137.1 | 128.9 | 15.3 |
| | 62 | "a" | 95.3 | 97.8 | 90.1 | 100.4 | 10.3 | 111.0 | 117.2 | 123.4 | 113.4 | 12.4 |
| | 63 | "a" | 99.7 | 103.9 | 114.1 | 99.1 | 15.0 | 119.0 | 130.4 | 127.2 | 120.0 | 11.4 |
| | 64 | "a" | 104.8 | 99.8 | 111.5 | 103.4 | 11.7 | 127.1 | 129.4 | 143.6 | 136.3 | 16.5 |
| | 65 | "a" | 108.3 | 100.2 | 118.6 | 107.6 | 18.4 | 125.8 | 124.0 | 157.1 | 127.9 | 33.1 |
| | 66 | "a" | 102.4 | 99.3 | 110.6 | 98.9 | 11.7 | 125.3 | 134.2 | 143.3 | 128.6 | 18.0 |
| | 67 | "a" | 97.3 | 99.8 | 117.8 | 100.1 | 20.5 | 113.7 | 116.4 | 138.7 | 119.9 | 25.0 |

| | | | Property values of polyester film | | | | | | | | |
|---|---|---|---|---|---|---|---|---|---|---|---|
| | | | Moduli of elasticity (GPa) | | | | Dry heat shrinkage rates (%) | | | | Laminate Cold moldability |
| | | | 0° (MD) | 45° | 90° (TD) | 135° | 0° (MD) | 45° | 90° (TD) | 135° | Erichsen value mm |
| Examples | 33 | | 2.9 | 2.8 | 2.7 | 2.9 | 8.3 | 8.4 | 8.8 | 8.1 | 9.3 |
| | 34 | | 2.9 | 2.8 | 2.6 | 2.8 | 8.4 | 8.3 | 8.6 | 8.2 | 9.4 |
| | 35 | | 2.7 | 2.7 | 2.6 | 2.7 | 8.2 | 8.0 | 8.4 | 8.0 | 9.2 |
| | 36 | | 2.6 | 2.4 | 2.5 | 2.5 | 8.3 | 8.3 | 8.1 | 8.2 | 9.3 |
| | 37 | | 2.6 | 2.4 | 2.4 | 2.3 | 8.4 | 8.1 | 8.2 | 8.1 | 9.3 |
| | 38 | | 2.8 | 2.9 | 2.9 | 2.9 | 8.5 | 7.9 | 7.7 | 8.1 | 9.0 |
| | 39 | | 2.6 | 2.5 | 2.6 | 2.6 | 10.1 | 10.7 | 11.7 | 10.5 | 9.2 |
| | 40 | | 2.8 | 2.8 | 3.0 | 3.0 | 6.3 | 5.6 | 4.8 | 5.7 | 8.6 |
| | 41 | | 3.0 | 2.9 | 2.8 | 2.7 | 5.3 | 4.2 | 3.4 | 4.3 | 8.5 |
| | 42 | | 3.0 | 2.8 | 2.7 | 2.7 | 6.2 | 5.4 | 4.9 | 5.4 | 8.6 |
| | 43 | | 3.2 | 3.0 | 2.9 | 2.8 | 5.4 | 4.2 | 3.3 | 4.2 | 8.7 |
| | 44 | | 2.6 | 2.4 | 2.2 | 2.4 | 13.2 | 14.6 | 16.3 | 14.8 | 7.9 |
| | 45 | | 3.2 | 3.1 | 3.4 | 3.3 | 2.4 | 1.0 | −0.2 | 0.9 | 7.3 |
| | 46 | | 3.0 | 2.8 | 2.7 | 2.8 | 8.4 | 8.4 | 8.8 | 8.2 | 9.0 |
| | 47 | | 3.0 | 3.0 | 2.8 | 2.9 | 8.5 | 8.4 | 8.6 | 8.2 | 9.0 |
| | 48 | | 2.6 | 2.7 | 2.8 | 2.7 | 8.1 | 8.0 | 8.3 | 8.0 | 8.8 |
| | 49 | | 2.5 | 2.4 | 2.6 | 2.4 | 8.2 | 8.4 | 8.1 | 8.2 | 8.8 |
| | 50 | | 2.7 | 2.5 | 2.5 | 2.4 | 8.4 | 8.2 | 8.2 | 8.1 | 8.7 |
| | 51 | | 2.7 | 2.8 | 2.8 | 2.6 | 8.4 | 7.9 | 7.7 | 8.0 | 8.5 |
| | 52 | | 2.6 | 2.6 | 2.4 | 2.5 | 10.3 | 10.5 | 11.2 | 10.7 | 8.7 |
| | 53 | | 2.9 | 2.9 | 3.0 | 2.8 | 6.2 | 5.6 | 4.9 | 5.6 | 8.3 |
| | 54 | | 2.9 | 2.8 | 2.8 | 2.7 | 5.4 | 4.2 | 3.3 | 4.2 | 8.1 |
| | 55 | | 2.9 | 3.0 | 2.8 | 2.9 | 6.2 | 5.3 | 4.8 | 5.3 | 8.2 |
| | 56 | | 3.1 | 2.8 | 2.8 | 2.9 | 5.4 | 4.2 | 3.4 | 4.1 | 8.2 |
| | 57 | | 2.8 | 2.7 | 3.0 | 2.9 | 6.3 | 5.6 | 5.3 | 5.5 | 9.5 |
| | 58 | | 2.8 | 2.7 | 2.8 | 2.9 | 6.3 | 6.3 | 5.0 | 6.1 | 9.6 |

TABLE 4-continued

| | | | | | | | | | |
|---|---|---|---|---|---|---|---|---|---|
| 59 | 2.7 | 2.5 | 2.5 | 2.4 | 8.5 | 8.6 | 9.0 | 8.5 | 9.3 |
| 60 | 2.8 | 2.7 | 2.8 | 2.7 | 5.9 | 5.8 | 5.4 | 5.4 | 9.6 |
| 61 | 2.8 | 2.7 | 2.7 | 2.7 | 8.2 | 8.1 | 8.8 | 8.4 | 9.3 |
| 62 | 2.6 | 2.6 | 2.6 | 2.4 | 8.9 | 9.0 | 9.2 | 8.9 | 8.9 |
| 63 | 3.1 | 3.0 | 3.2 | 3.1 | 3.5 | 2.5 | 1.5 | 2.6 | 8.5 |
| 64 | 3.2 | 3.2 | 3.3 | 3.1 | 5.0 | 4.6 | 4.2 | 4.4 | 8.3 |
| 65 | 3.1 | 3.2 | 3.3 | 3.2 | 4.9 | 4.1 | 3.8 | 4.0 | 8.0 |
| 66 | 2.9 | 3.0 | 3.0 | 2.9 | 8.0 | 8.0 | 8.4 | 8.1 | 8.1 |
| 67 | 2.8 | 3.1 | 3.1 | 2.9 | 10.5 | 10.8 | 11.5 | 10.2 | 8.1 |

TABLE 5

| | | | | | | Production conditions | | | | |
|---|---|---|---|---|---|---|---|---|---|---|
| | | | Polyester resin (R) | | | Longitudinal direction (MD) | | Transverse direction (TD) | | |
| | | | Constitution | | Property value | Drawing | | Drawing | | Heat treatment |
| | | Resin (A) | Resin (B) | (A)/(B) or (Bc)/(Bh) (mass ratio) | Limiting viscosity | Temperature °C. | Magnification ($DR_{MD}$) | Temperature °C. | Magnification ($DR_{TD}$) | Temperature °C. |
| Comparative Examples | 1 | A-1 | Bh-1 | 10/90 | 0.71 | 85 | 2.5 | 100 | 4.50 | 190 |
| | 2 | A-1 | Bh-1 | 10/90 | 0.71 | 85 | 4.0 | 140 | 3.50 | 190 |
| | 3 | A-1 | Bh-1 | 10/90 | 0.71 | 105 | 2.8 | 100 | 4.15 | 190 |
| | 4 | A-1 | Bh-1 | 10/90 | 0.71 | 85 | 3.4 | 100 | 5.00 | 190 |
| | 5 | A-1 | Bh-1 | 10/90 | 0.71 | 85 | 3.0 | 80 | 5.20 | 190 |
| | 6 | A-1 | Bh-1 | 10/90 | 0.71 | 105 | 2.8 | 100 | 4.15 | 150 |
| | 7 | A-1 | Bh-1 | 10/90 | 0.71 | 85 | 3.4 | 100 | 5.00 | 240 |
| | 8 | A-1 | Bh-1 | 5/95 | 0.69 | 85 | 2.5 | 100 | 4.50 | 190 |
| | 9 | A-1 | Bh-1 | 20/80 | 0.75 | 85 | 3.4 | 100 | 5.00 | 190 |
| | 10 | A-1 | Bh-1 | 10/90 | 0.71 | 60 | 3.0 | 130 | 3.30 | 190 |
| | 11 | A-1 | Bh-1 | 10/90 | 0.71 | 60 | 4.0 | 120 | 4.40 | 220 |
| | 12 | A-1 | Bh-1 | 10/90 | 0.71 | 90 | 3.0 | 90 | 4.50 | 190 |
| | 13 | A-1 | Bh-1 | 10/90 | 0.71 | 80 | 3.4 | 90 | 4.70 | 190 |
| | 14 | A-1 | Bh-1 | 10/90 | 0.71 | 105 | 2.9 | 80 | 4.00 | 190 |
| | 15 | A-1 | Bh-1 | 10/90 | 0.71 | 85 | 3.4 | 130 | 3.30 | 150 |
| | 16 | A-1 | Bh-1 | 10/90 | 0.71 | 110 | 2.5 | 120 | 4.00 | 150 |
| | 17 | A-1 | Bh-1 | 10/90 | 0.71 | 85 | 2.5 | 100 | 4.50 | 190 |
| | 18 | A-1 | Bh-1 | 10/90 | 0.71 | 85 | 4.0 | 140 | 3.50 | 190 |
| | 19 | A-1 | Bh-1 | 10/90 | 0.71 | 105 | 2.8 | 100 | 4.15 | 190 |
| | 20 | A-1 | Bh-1 | 10/90 | 0.71 | 85 | 3.4 | 100 | 5.00 | 190 |
| | 21 | A-1 | Bh-1 | 10/90 | 0.71 | 85 | 3.0 | 80 | 5.20 | 190 |
| | 22 | A-1 | Bh-1 | 10/90 | 0.71 | 105 | 2.8 | 100 | 4.15 | 150 |
| | 23 | A-1 | Bh-1 | 10/90 | 0.71 | 85 | 3.4 | 100 | 5.00 | 240 |
| | 24 | A-1 | Bh-1 | 10/90 | 0.71 | 85 | 2.5 | 100 | 4.50 | 190 |
| | 25 | A-1 | Bh-1 | 10/90 | 0.71 | 85 | 4.0 | 140 | 3.50 | 190 |
| | 26 | A-1 | Bh-1 | 10/90 | 0.71 | 105 | 2.8 | 100 | 4.15 | 190 |
| | 27 | A-1 | Bh-1 | 10/90 | 0.71 | 85 | 3.4 | 100 | 5.00 | 190 |
| | 28 | A-1 | Bh-1 | 10/90 | 0.71 | 85 | 3.0 | 80 | 5.20 | 190 |
| | 29 | A-1 | Bh-1 | 10/90 | 0.71 | 105 | 2.8 | 100 | 4.15 | 150 |
| | 30 | A-1 | Bh-1 | 10/90 | 0.71 | 85 | 3.4 | 100 | 5.00 | 240 |
| | 31 | A-2 | Bh-1 | 10/90 | 0.69 | 90 | 2.5 | 110 | 4.50 | 230 |
| | 32 | A-2 | Bh-1 | 10/90 | 0.69 | 60 | 3.6 | 110 | 3.50 | 190 |
| | 33 | A-2 | Bh-1 | 10/90 | 0.69 | 110 | 3.0 | 80 | 5.20 | 190 |
| | 34 | A-1 | Bh-2 | 60/40 | 0.97 | 110 | 3.39 | 80 | 4.25 | 167 |

Relaxation rate %: 8.0, 3.0, 5.0, 3.0, 5.0, 5.0, 3.0, 8.0, 3.0, 5.0, 6.0, 6.0, 5.0, 6.0, 6.0, 6.0, 8.0, 3.0, 5.0, 3.0, 5.0, 5.0, 3.0, 8.0, 3.0, 5.0, 3.0, 5.0, 5.0, 3.0, 10.0, 3.0, 6.0, 5.0

| | | Production conditions | | Property values of polyester film | | | | | |
|---|---|---|---|---|---|---|---|---|---|
| | | Drawing magnification ratio ($DR_{MD}/DR_{TD}$) | Area magnification ($DR_{MD} \times DR_{TD}$) | Thicknesses (µm) | | | | | |
| | | | | Film roll "a" | | Film roll "b" | | Film roll "c" | |
| | | | | Average value | Standard deviation | Average value | Standard deviation | Average value | Standard deviation |
| Comparative Examples | 1 | 0.56 | 11.3 | 25.0 | 0.35 | 25.1 | 0.38 | 25.3 | 0.37 |
| | 2 | 1.14 | 14.0 | 25.1 | 0.34 | 25.1 | 0.36 | 24.9 | 0.33 |
| | 3 | 0.67 | 11.6 | 24.9 | 0.29 | 24.9 | 0.28 | 24.7 | 0.29 |
| | 4 | 0.68 | 17.0 | 24.6 | 0.26 | 24.7 | 0.27 | 24.6 | 0.27 |
| | 5 | 0.58 | 15.6 | 25.4 | 0.34 | 25.2 | 0.34 | 25.1 | 0.33 |
| | 6 | 0.67 | 11.6 | 24.8 | 0.37 | 24.9 | 0.38 | 24.9 | 0.37 |
| | 7 | 0.68 | 17.0 | 24.9 | 0.38 | 25.0 | 0.37 | 25.0 | 0.39 |
| | 8 | 0.56 | 11.3 | 25.0 | 0.29 | 25.1 | 0.31 | 25.1 | 0.30 |
| | 9 | 0.68 | 17.0 | 24.9 | 0.32 | 25.1 | 0.33 | 24.9 | 0.31 |
| | 10 | 0.91 | 9.9 | 25.0 | 0.39 | 25.0 | 0.38 | 25.1 | 0.41 |

TABLE 5-continued

| | | | | | | | | | |
|---|---|---|---|---|---|---|---|---|---|
| | 11 | 0.91 | 17.6 | 25.1 | 0.33 | 25.1 | 0.34 | 25.0 | 0.33 |
| | 12 | 0.67 | 13.5 | 25.0 | 0.31 | 24.9 | 0.31 | 24.9 | 0.32 |
| | 13 | 0.72 | 16.0 | 24.9 | 0.42 | 25.1 | 0.40 | 24.9 | 0.43 |
| | 14 | 0.73 | 11.6 | 25.0 | 0.33 | 25.0 | 0.31 | 25.1 | 0.32 |
| | 15 | 1.03 | 11.2 | 25.0 | 0.31 | 24.9 | 0.30 | 24.9 | 0.32 |
| | 16 | 0.63 | 10.0 | 25.1 | 0.32 | 24.8 | 0.31 | 25.0 | 0.33 |
| | 17 | 0.56 | 11.3 | 15.1 | 0.33 | 15.1 | 0.36 | 15.2 | 0.37 |
| | 18 | 1.14 | 14.0 | 15.0 | 0.32 | 15.0 | 0.36 | 14.9 | 0.33 |
| | 19 | 0.67 | 11.6 | 15.1 | 0.34 | 15.0 | 0.37 | 15.1 | 0.38 |
| | 20 | 0.68 | 17.0 | 14.9 | 0.28 | 14.9 | 0.29 | 14.8 | 0.27 |
| | 21 | 0.58 | 15.6 | 15.0 | 0.27 | 14.8 | 0.28 | 14.8 | 0.30 |
| | 22 | 0.67 | 11.6 | 14.9 | 0.38 | 15.0 | 0.37 | 15.2 | 0.36 |
| | 23 | 0.68 | 17.0 | 15.2 | 0.30 | 15.0 | 0.32 | 15.1 | 0.33 |
| | 24 | 0.56 | 11.3 | 10.0 | 0.38 | 10.1 | 0.38 | 10.1 | 0.37 |
| | 25 | 1.14 | 14.0 | 10.1 | 0.32 | 9.9 | 0.33 | 9.9 | 0.33 |
| | 26 | 0.67 | 11.6 | 9.9 | 0.39 | 9.8 | 0.36 | 10.0 | 0.37 |
| | 27 | 0.68 | 17.0 | 9.7 | 0.30 | 10.0 | 0.31 | 10.1 | 0.32 |
| | 28 | 0.58 | 15.6 | 9.8 | 0.32 | 10.0 | 0.31 | 9.7 | 0.29 |
| | 29 | 0.67 | 11.6 | 10.2 | 0.37 | 10.1 | 0.38 | 9.8 | 0.37 |
| | 30 | 0.68 | 17.0 | 10.3 | 0.33 | 10.2 | 0.32 | 10.2 | 0.38 |
| | 31 | 0.56 | 11.3 | 25.1 | 0.33 | 25.2 | 0.33 | 25.1 | 0.34 |
| | 32 | 1.03 | 12.6 | 25.0 | 0.40 | 25.1 | 0.41 | 25.0 | 0.41 |
| | 33 | 0.58 | 15.6 | 25.0 | 0.29 | 24.9 | 0.28 | 24.8 | 0.31 |
| | 34 | 0.80 | 14.4 | 24.7 | 0.28 | 24.6 | 0.29 | 24.6 | 0.27 |

TABLE 6

| | | | | Property values of polyester film | | | | | | | |
|---|---|---|---|---|---|---|---|---|---|---|---|
| | | | | Stresses (MPa) | | | | | | | |
| | | | | At 5% elongation (F5) | | | | At 15% elongation (F15) | | | |
| | | Film roll | 0° (MD) | 45° | 90° (TD) | 135° | Maximum value − minimum value (ΔF5) | 0° (MD) | 45° | 90° (TD) | 135° | Maximum value − minimum value (ΔF15) |
| Comparative Examples | 1 | "a" | 81.4 | 107.5 | 132.1 | 113.3 | 50.7 | 101.3 | 131.5 | 161.2 | 128.1 | 59.9 |
| | 2 | "a" | 120.2 | 89.5 | 67.1 | 87.6 | 53.1 | 149.4 | 119.4 | 78.1 | 122.1 | 71.3 |
| | 3 | "a" | 74.4 | 84.6 | 123.2 | 86.1 | 48.8 | 85.7 | 111.4 | 156.7 | 108.6 | 71.0 |
| | 4 | "a" | 104.0 | 101.2 | 140.1 | 113.1 | 38.9 | 118.6 | 119.4 | 169.1 | 115.3 | 53.8 |
| | 5 | "a" | 80.3 | 117.2 | 135.8 | 109.7 | 55.5 | 93.6 | 134.1 | 176.0 | 142.1 | 82.4 |
| | 6 | "a" | 68.4 | 81.4 | 119.2 | 85.9 | 50.8 | 79.7 | 110.9 | 143.9 | 99.7 | 64.2 |
| | 7 | "a" | 113.8 | 118.1 | 151.7 | 118.3 | 37.9 | 138.4 | 139.9 | 188.7 | 143.5 | 50.3 |
| | 8 | "a" | 83.4 | 108.4 | 135.1 | 114.2 | 51.7 | 101.7 | 134.4 | 167.1 | 132.1 | 65.4 |
| | 9 | "a" | 106.8 | 107.3 | 143.8 | 110.4 | 37.0 | 124.4 | 120.2 | 178.7 | 124.8 | 58.5 |
| | 10 | "a" | 114.1 | 79.9 | 67.9 | 83.4 | 46.2 | 148.9 | 98.7 | 77.4 | 102.4 | 71.5 |
| | 11 | "a" | 141.3 | 124.3 | 105.1 | 123.7 | 36.2 | 178.2 | 144.2 | 125.6 | 150.1 | 52.6 |
| | 12 | "a" | 84.8 | 105.9 | 137.6 | 108.4 | 52.8 | 97.6 | 132.1 | 170.7 | 129.9 | 73.1 |
| | 13 | "a" | 98.8 | 112.2 | 139.8 | 113.0 | 41.0 | 124.5 | 146.7 | 174.3 | 148.4 | 49.8 |
| | 14 | "a" | 75.3 | 95.7 | 130.8 | 100.2 | 55.5 | 88.4 | 134.1 | 165.4 | 121.0 | 77.0 |
| | 15 | "a" | 97.6 | 74.1 | 66.4 | 71.2 | 31.2 | 113.2 | 91.0 | 78.8 | 88.9 | 34.4 |
| | 16 | "a" | 61.9 | 72.3 | 92.8 | 74.5 | 30.9 | 73.5 | 84.9 | 111.7 | 86.9 | 38.2 |
| | 17 | "a" | 81.6 | 107.6 | 133.7 | 114.2 | 52.1 | 99.7 | 133.8 | 164.9 | 134.8 | 65.2 |
| | 18 | "a" | 121.3 | 88.9 | 66.9 | 88.4 | 54.4 | 155.6 | 118.9 | 77.9 | 124.7 | 77.7 |
| | 19 | "a" | 75.6 | 86.9 | 126.2 | 86.9 | 50.6 | 84.9 | 110.9 | 159.9 | 107.8 | 75.0 |
| | 20 | "a" | 105.8 | 104.2 | 144.8 | 116.2 | 40.6 | 117.9 | 118.4 | 169.4 | 114.9 | 54.5 |
| | 21 | "a" | 83.2 | 118.1 | 140.1 | 107.2 | 56.9 | 92.8 | 136.8 | 179.3 | 145.9 | 86.5 |
| | 22 | "a" | 70.2 | 82.9 | 123.1 | 88.2 | 52.9 | 83.1 | 110.7 | 144.8 | 103.1 | 61.7 |
| | 23 | "a" | 116.2 | 119.9 | 153.2 | 118.1 | 37.0 | 136.9 | 141.2 | 186.9 | 147.9 | 50.0 |
| | 24 | "a" | 83.1 | 108.6 | 134.2 | 111.0 | 51.1 | 102.7 | 134.9 | 162.1 | 131.9 | 59.4 |
| | 25 | "a" | 121.8 | 89.4 | 68.3 | 86.1 | 53.5 | 152.3 | 127.6 | 77.9 | 120.9 | 74.4 |
| | 26 | "a" | 76.1 | 88.1 | 126.3 | 89.2 | 50.2 | 86.9 | 115.1 | 159.9 | 105.6 | 73.0 |
| | 27 | "a" | 106.9 | 104.1 | 145.9 | 112.0 | 41.8 | 119.4 | 115.7 | 168.9 | 113.1 | 55.8 |
| | 28 | "a" | 79.2 | 116.9 | 138.4 | 110.3 | 59.2 | 92.8 | 131.8 | 177.1 | 145.6 | 84.3 |
| | 29 | "a" | 69.6 | 82.2 | 121.3 | 86.4 | 51.7 | 83.2 | 112.8 | 146.7 | 103.9 | 63.5 |
| | 30 | "a" | 115.3 | 117.9 | 152.9 | 122.7 | 37.6 | 129.7 | 124.9 | 179.1 | 121.9 | 57.2 |
| | 31 | "a" | 85.7 | 112.8 | 139.7 | 115.3 | 54.0 | 103.4 | 135.4 | 174.6 | 139.4 | 71.2 |
| | 32 | "a" | 117.4 | 93.7 | 72.9 | 94.8 | 44.5 | 141.3 | 120.2 | 95.7 | 128.9 | 45.6 |
| | 33 | "a" | 81.4 | 118.0 | 141.9 | 113.8 | 60.5 | 95.7 | 138.8 | 180.3 | 146.9 | 84.6 |
| | 34 | "a" | 61.0 | 62.3 | 73.9 | 64.0 | 12.9 | 83.3 | 76.1 | 105.1 | 72.0 | 33.1 |

TABLE 6-continued

| | | | Property values of polyester film | | | | | | | |
|---|---|---|---|---|---|---|---|---|---|---|
| | | | Moduli of elasticity (GPa) | | | | Dry heat shrinkage rates (%) | | | Laminate Cold moldability |
| | | | 0° (MD) | 45° | 90° (TD) | 135° | 0° (MD) | 45° | 90° (TD) | 135° | Erichsen value mm |
| | | | | | | | | | | | |

| | | | 0° (MD) | 45° | 90° (TD) | 135° | 0° (MD) | 45° | 90° (TD) | 135° | Erichsen value mm |
|---|---|---|---|---|---|---|---|---|---|---|---|
| Comparative Examples | 1 | | 2.8 | 2.6 | 2.9 | 2.7 | 4.8 | 4.0 | 2.7 | 4.1 | 4.8 |
| | 2 | | 3.6 | 3.0 | 2.4 | 2.8 | 5.5 | 4.2 | 3.6 | 3.7 | 4.0 |
| | 3 | | 2.9 | 2.7 | 2.6 | 2.7 | 4.8 | 4.1 | 3.2 | 4.0 | 5.1 |
| | 4 | | 3.1 | 3.3 | 3.7 | 3.1 | 4.8 | 4.0 | 3.8 | 4.1 | 5.2 |
| | 5 | | 3.2 | 3.7 | 4.3 | 3.7 | 4.8 | 4.9 | 5.0 | 4.8 | 4.5 |
| | 6 | | 2.2 | 2.3 | 2.3 | 2.2 | 13.2 | 15.0 | 17.3 | 14.6 | 4.6 |
| | 7 | | 3.8 | 3.8 | 4.1 | 3.9 | 0.6 | −0.2 | −0.3 | −0.2 | 4.9 |
| | 8 | | 2.9 | 2.7 | 2.8 | 2.7 | 4.8 | 3.9 | 3.7 | 4.0 | 4.8 |
| | 9 | | 3.1 | 3.3 | 3.9 | 3.2 | 4.9 | 4.0 | 3.8 | 3.9 | 5.4 |
| | 10 | | 2.8 | 2.7 | 2.9 | 2.8 | 5.2 | 4.0 | 3.4 | 4.1 | 4.9 |
| | 11 | | 3.8 | 3.7 | 3.6 | 3.6 | 2.1 | 0.8 | 0.1 | 0.7 | 5.2 |
| | 12 | | 2.8 | 2.8 | 3.6 | 2.9 | 5.1 | 4.3 | 3.5 | 4.3 | 4.1 |
| | 13 | | 2.9 | 3.1 | 3.7 | 3.2 | 5.1 | 4.1 | 3.7 | 4.3 | 5.0 |
| | 14 | | 2.8 | 3.2 | 3.5 | 3.3 | 4.8 | 4.1 | 3.5 | 4.2 | 3.9 |
| | 15 | | 2.4 | 2.0 | 1.8 | 1.9 | 14.2 | 15.3 | 17.0 | 14.3 | 4.6 |
| | 16 | | 1.8 | 2.2 | 2.1 | 1.9 | 13.4 | 14.8 | 17.1 | 14.6 | 4.5 |
| | 17 | | 2.9 | 2.7 | 3.0 | 2.7 | 4.9 | 4.1 | 2.8 | 4.2 | 4.8 |
| | 18 | | 3.6 | 3.1 | 2.5 | 2.8 | 5.4 | 4.3 | 3.5 | 3.8 | 4.0 |
| | 19 | | 2.8 | 2.7 | 2.6 | 2.6 | 4.9 | 4.2 | 3.2 | 4.1 | 5.1 |
| | 20 | | 3.0 | 3.2 | 3.7 | 3.2 | 4.9 | 4.1 | 3.8 | 4.1 | 5.2 |
| | 21 | | 2.9 | 3.3 | 4.1 | 3.4 | 4.9 | 5.0 | 5.1 | 4.9 | 4.5 |
| | 22 | | 2.3 | 2.2 | 2.3 | 2.2 | 13.5 | 15.6 | 17.2 | 15.1 | 4.6 |
| | 23 | | 3.7 | 3.8 | 4.0 | 3.8 | 0.6 | −0.1 | −0.1 | −0.3 | 4.9 |
| | 24 | | 2.7 | 2.5 | 2.7 | 2.9 | 4.9 | 4.2 | 2.8 | 4.3 | 4.8 |
| | 25 | | 3.7 | 3.1 | 2.6 | 2.8 | 5.5 | 4.3 | 3.7 | 3.8 | 4.0 |
| | 26 | | 2.8 | 2.9 | 2.6 | 2.7 | 5.1 | 5.2 | 3.3 | 4.1 | 5.1 |
| | 27 | | 3.2 | 3.4 | 3.8 | 3.2 | 5.1 | 4.1 | 3.9 | 4.2 | 5.2 |
| | 28 | | 3.9 | 3.4 | 4.2 | 3.8 | 4.8 | 4.8 | 4.9 | 4.7 | 4.5 |
| | 29 | | 2.1 | 2.3 | 2.2 | 2.3 | 13.3 | 15.1 | 17.4 | 14.9 | 4.6 |
| | 30 | | 3.9 | 3.7 | 4.0 | 3.9 | 0.4 | −0.2 | −0.2 | −0.1 | 4.9 |
| | 31 | | 2.9 | 3.5 | 3.7 | 3.7 | 1.9 | 0.6 | 0.2 | 0.5 | 4.6 |
| | 32 | | 3.6 | 3.3 | 2.5 | 2.7 | 5.0 | 4.1 | 3.1 | 4.2 | 4.5 |
| | 33 | | 2.9 | 3.8 | 4.4 | 3.8 | 5.1 | 4.2 | 3.5 | 4.4 | 4.3 |
| | 34 | | 2.1 | 2.1 | 1.9 | 1.8 | 12.1 | 11.9 | 13.4 | 11.2 | 6.2 |

TABLE 7

| | | | Property values of polyester film | | | | | | | | | |
|---|---|---|---|---|---|---|---|---|---|---|---|---|
| | | | Stresses (MPa) | | | | | | | | | |
| | | | At 5% elongation (F5) | | | | | At 15% elongation (F15) | | | | |
| | | Film roll | 0° (MD) | 45° | 90° (TD) | 135° | Maximum value − minimum value (ΔF5) | 0° (MD) | 45° | 90° (TD) | 135° | Maximum value − minimum value (ΔF15) |
| Examples | 3 | "b" | 101.4 | 106.5 | 101.6 | 90.8 | 15.7 | 117.4 | 135.3 | 125.1 | 104.2 | 31.1 |
| | 4 | "b" | 97.4 | 104.4 | 97.6 | 87.8 | 16.6 | 114.7 | 134.9 | 121.8 | 104.6 | 30.3 |
| | 5 | "b" | 96.6 | 101.1 | 95.8 | 84.7 | 16.4 | 110.5 | 130.7 | 120.4 | 100.1 | 30.6 |
| | 6 | "b" | 89.1 | 98.4 | 88.9 | 78.2 | 20.2 | 104.6 | 126.4 | 109.7 | 91.2 | 35.2 |
| | 9 | "b" | 105.9 | 112.7 | 106.8 | 92.8 | 19.9 | 122.4 | 138.9 | 125.1 | 107.9 | 31.0 |
| | 10 | "b" | 104.2 | 112.4 | 105.4 | 93.4 | 19.0 | 118.2 | 138.9 | 126.8 | 104.7 | 34.2 |
| | 11 | "b" | 103.1 | 108.5 | 101.7 | 93.9 | 14.6 | 116.9 | 141.0 | 126.6 | 105.8 | 35.2 |
| | 12 | "b" | 109.8 | 117.9 | 103.9 | 98.1 | 19.8 | 123.5 | 147.8 | 127.6 | 112.1 | 35.7 |
| | 13 | "b" | 106.7 | 113.7 | 102.0 | 92.4 | 21.3 | 121.7 | 140.4 | 125.9 | 106.1 | 34.3 |
| | 14 | "b" | 98.6 | 111.3 | 105.6 | 94.1 | 17.2 | 110.5 | 143.8 | 126.6 | 104.4 | 39.4 |
| | 15 | "b" | 110.3 | 114.9 | 94.7 | 93.3 | 21.6 | 128.4 | 148.8 | 113.4 | 106.8 | 42.0 |
| | 16 | "b" | 104.5 | 105.0 | 97.4 | 87.2 | 17.8 | 122.1 | 132.2 | 115.6 | 97.4 | 34.8 |
| | 17 | "b" | 113.8 | 119.8 | 99.7 | 95.1 | 24.7 | 125.9 | 142.7 | 115.1 | 103.8 | 38.9 |
| | 18 | "b" | 104.4 | 109.8 | 100.3 | 90.1 | 19.7 | 117.5 | 133.4 | 119.6 | 102.1 | 31.3 |
| | 19 | "b" | 115.7 | 118.4 | 96.7 | 89.4 | 29.0 | 131.8 | 147.2 | 113.9 | 103.0 | 44.2 |
| | 22 | "b" | 105.8 | 113.4 | 107.4 | 94.6 | 18.8 | 125.1 | 140.3 | 126.9 | 109.3 | 31.0 |
| | 23 | "b" | 105.3 | 113.5 | 104.9 | 94.8 | 18.7 | 119.3 | 137.7 | 129.3 | 103.4 | 34.3 |
| | 24 | "b" | 106.1 | 109.7 | 103.4 | 96.8 | 12.9 | 117.2 | 142.9 | 127.3 | 106.9 | 36.0 |
| | 25 | "b" | 111.0 | 119.1 | 102.7 | 98.8 | 20.3 | 125.9 | 151.0 | 128.4 | 111.1 | 39.9 |
| | 26 | "b" | 105.9 | 114.8 | 101.8 | 91.9 | 22.9 | 121.8 | 137.9 | 124.9 | 105.3 | 32.6 |
| | 27 | "b" | 99.8 | 113.1 | 106.4 | 93.9 | 19.2 | 119.4 | 142.1 | 125.9 | 103.1 | 39.0 |
| | 28 | "b" | 109.9 | 115.3 | 94.9 | 93.8 | 21.5 | 126.5 | 145.1 | 114.2 | 107.3 | 37.8 |

TABLE 7-continued

|  |  |  |  |  |  |  |  |  |  |  |  |
|---|---|---|---|---|---|---|---|---|---|---|---|
|  | 31 | "b" | 104.9 | 113.1 | 102.0 | 88.9 | 24.2 | 116.7 | 134.8 | 120.8 | 104.5 | 30.3 |
|  | 32 | "b" | 116.8 | 120.3 | 97.1 | 90.5 | 29.8 | 135.1 | 145.7 | 112.7 | 101.9 | 43.8 |
| Comparative Examples | 1 | "b" | 79.0 | 132.6 | 98.3 | 80.4 | 53.6 | 90.2 | 156.9 | 119.4 | 89.4 | 67.5 |
|  | 2 | "b" | 107.1 | 128.6 | 82.3 | 72.9 | 55.7 | 128.1 | 150.3 | 98.6 | 83.4 | 66.9 |
|  | 3 | "b" | 78.1 | 130.7 | 95.1 | 80.4 | 52.6 | 98.7 | 161.9 | 127.6 | 91.4 | 70.5 |
|  | 4 | "b" | 102.1 | 141.8 | 119.3 | 90.1 | 51.7 | 123.8 | 175.6 | 131.7 | 102.4 | 73.2 |
|  | 5 | "b" | 98.8 | 153.4 | 102.9 | 92.3 | 61.1 | 112.3 | 187.6 | 124.3 | 105.1 | 82.5 |
|  | 6 | "b" | 72.1 | 125.1 | 100.4 | 78.1 | 53.0 | 83.2 | 155.7 | 118.7 | 88.6 | 72.5 |
|  | 7 | "b" | 106.8 | 151.1 | 125.9 | 94.3 | 56.8 | 126.9 | 189.6 | 147.4 | 108.4 | 81.2 |
|  | 8 | "b" | 80.6 | 133.9 | 100.7 | 82.7 | 53.3 | 92.3 | 167.9 | 128.4 | 93.6 | 75.6 |
|  | 9 | "b" | 100.2 | 139.4 | 116.9 | 88.9 | 50.5 | 123.7 | 183.5 | 134.2 | 100.2 | 83.3 |
|  | 10 | "b" | 96.9 | 117.3 | 68.3 | 72.4 | 49.0 | 118.3 | 151.0 | 79.9 | 80.6 | 71.1 |
|  | 11 | "b" | 149.1 | 143.1 | 108.2 | 104.9 | 44.2 | 176.9 | 181.3 | 131.1 | 127.6 | 53.7 |
|  | 12 | "b" | 88.1 | 149.3 | 141.9 | 99.7 | 61.2 | 104.6 | 188.3 | 169.4 | 113.8 | 83.7 |
|  | 13 | "b" | 103.5 | 154.3 | 136.9 | 102.0 | 52.3 | 119.3 | 189.7 | 157.1 | 117.5 | 72.2 |
|  | 14 | "b" | 78.9 | 133.9 | 118.1 | 96.1 | 55.0 | 89.7 | 163.7 | 135.4 | 108.1 | 74.0 |
|  | 31 | "b" | 91.3 | 138.6 | 105.9 | 84.5 | 54.1 | 109.9 | 165.8 | 128.8 | 100.5 | 65.3 |
|  | 32 | "b" | 109.9 | 130.6 | 95.3 | 84.1 | 46.5 | 138.9 | 163.4 | 113.4 | 92.7 | 70.7 |
|  | 33 | "b" | 78.2 | 107.3 | 126.4 | 109.5 | 48.2 | 89.3 | 123.6 | 164.6 | 131.1 | 75.3 |

|  |  | Property values of polyester film ||||||||
|---|---|---|---|---|---|---|---|---|---|
|  |  | Moduli of elasticity (GPa) |||| Dry heat shrinkage rates (%) |||| Laminate Cold moldability |
|  |  | 0° (MD) | 45° | 90° (TD) | 135° | 0° (MD) | 45° | 90° (TD) | 135° | Erichsen value mm |
| Examples | 3 | 2.8 | 3.1 | 3.0 | 2.5 | 5.3 | 3.9 | 3.4 | 3.6 | 7.7 |
|  | 4 | 2.8 | 3.1 | 3.1 | 2.5 | 5.4 | 4.0 | 3.4 | 3.7 | 7.5 |
|  | 5 | 2.7 | 3.0 | 3.0 | 2.4 | 5.3 | 4.0 | 3.4 | 3.7 | 7.5 |
|  | 6 | 2.7 | 3.0 | 2.9 | 2.4 | 5.4 | 3.9 | 3.4 | 3.6 | 7.2 |
|  | 9 | 2.9 | 3.1 | 3.1 | 2.6 | 5.4 | 4.1 | 3.5 | 3.7 | 7.9 |
|  | 10 | 3.0 | 3.2 | 3.1 | 2.7 | 7.4 | 7.2 | 7.0 | 7.1 | 7.7 |
|  | 11 | 3.0 | 3.2 | 3.1 | 2.8 | 3.8 | 2.4 | 1.4 | 2.2 | 7.8 |
|  | 12 | 3.1 | 3.2 | 3.2 | 2.8 | 3.0 | 1.4 | 0.3 | 1.1 | 7.6 |
|  | 13 | 2.8 | 2.9 | 3.0 | 2.6 | 7.4 | 7.5 | 7.7 | 7.2 | 7.5 |
|  | 14 | 2.8 | 3.0 | 2.9 | 2.7 | 7.3 | 7.0 | 6.7 | 6.9 | 7.4 |
|  | 15 | 3.0 | 3.2 | 3.1 | 2.5 | 5.2 | 4.3 | 3.3 | 4.0 | 7.3 |
|  | 16 | 2.7 | 2.9 | 2.9 | 2.5 | 5.2 | 4.0 | 3.3 | 3.7 | 7.4 |
|  | 17 | 3.0 | 3.2 | 2.9 | 2.6 | 5.5 | 4.2 | 3.5 | 3.8 | 7.2 |
|  | 18 | 2.9 | 3.1 | 2.9 | 2.5 | 7.3 | 7.1 | 6.9 | 7.0 | 7.7 |
|  | 19 | 3.1 | 3.1 | 3.1 | 2.6 | 5.6 | 4.4 | 3.4 | 4.2 | 7.0 |
|  | 22 | 3.0 | 3.2 | 3.2 | 2.7 | 5.4 | 4.2 | 3.6 | 3.7 | 7.5 |
|  | 23 | 2.9 | 3.1 | 3.0 | 2.8 | 7.5 | 7.3 | 7.0 | 7.1 | 7.4 |
|  | 24 | 3.1 | 3.2 | 3.2 | 2.8 | 3.9 | 2.5 | 1.4 | 2.3 | 7.5 |
|  | 25 | 3.1 | 3.4 | 3.2 | 2.8 | 3.1 | 1.5 | 0.4 | 1.2 | 7.3 |
|  | 26 | 2.9 | 3.0 | 3.0 | 2.7 | 7.5 | 7.5 | 7.8 | 7.4 | 7.1 |
|  | 27 | 2.9 | 3.1 | 3.0 | 2.8 | 7.3 | 7.0 | 6.7 | 6.8 | 7.0 |
|  | 28 | 3.1 | 3.2 | 2.9 | 2.6 | 5.1 | 4.4 | 3.4 | 4.2 | 6.9 |
|  | 31 | 2.9 | 3.2 | 2.9 | 2.6 | 7.4 | 7.2 | 7.0 | 7.1 | 7.5 |
|  | 32 | 3.2 | 3.1 | 3.2 | 2.6 | 5.5 | 4.2 | 3.2 | 4.1 | 6.7 |
| Comparative Examples | 1 | 2.7 | 3.4 | 3.5 | 2.7 | 5.1 | 4.3 | 3.0 | 4.0 | 3.8 |
|  | 2 | 3.1 | 3.2 | 3.0 | 2.7 | 5.3 | 4.2 | 3.4 | 4.4 | 3.0 |
|  | 3 | 2.6 | 3.0 | 3.1 | 2.5 | 5.2 | 4.5 | 3.6 | 4.2 | 4.1 |
|  | 4 | 2.9 | 3.5 | 3.3 | 2.7 | 5.4 | 4.6 | 3.8 | 4.2 | 4.2 |
|  | 5 | 2.8 | 3.9 | 3.7 | 2.7 | 5.1 | 4.5 | 3.6 | 4.1 | 3.5 |
|  | 6 | 2.6 | 2.9 | 2.9 | 2.4 | 13.9 | 15.5 | 17.5 | 15.9 | 3.6 |
|  | 7 | 3.2 | 3.8 | 3.7 | 3.1 | 1.1 | 0.2 | −0.3 | 0.4 | 3.2 |
|  | 8 | 2.6 | 3.2 | 3.2 | 2.6 | 5.2 | 4.6 | 3.4 | 4.2 | 3.8 |
|  | 9 | 2.9 | 3.9 | 3.8 | 2.6 | 5.4 | 4.6 | 3.8 | 4.2 | 3.4 |
|  | 10 | 2.7 | 3.3 | 3.2 | 2.7 | 5.1 | 4.2 | 3.0 | 3.9 | 4.2 |
|  | 11 | 3.8 | 3.9 | 3.4 | 2.9 | 2.0 | 0.7 | 0.2 | 0.5 | 4.3 |
|  | 12 | 2.7 | 3.7 | 3.6 | 2.9 | 4.9 | 4.2 | 3.4 | 4.0 | 3.4 |
|  | 13 | 2.8 | 3.9 | 3.7 | 3.0 | 5.1 | 4.4 | 3.7 | 4.1 | 3.8 |
|  | 14 | 2.4 | 3.4 | 3.4 | 2.6 | 4.8 | 4.1 | 3.3 | 3.8 | 3.6 |
|  | 31 | 2.7 | 3.6 | 3.5 | 3.0 | 2.0 | 0.5 | −0.3 | 0.4 | 4.6 |
|  | 32 | 3.3 | 3.2 | 3.0 | 2.8 | 5.5 | 4.3 | 3.4 | 4.0 | 4.5 |
|  | 33 | 3.0 | 4.0 | 4.0 | 2.9 | 5.2 | 4.6 | 3.7 | 4.1 | 4.3 |

As can be seen from these results, in Examples 1 to 57, the drawing magnification ratios ($DR_{MD}/DR_{TD}$) and the area magnifications ($DR_{MD} \times DR_{TD}$) fell within the ranges specified in the present invention, and consequently in each of the obtained polyester films, the difference between the maximum value of the stresses and the minimum value of the stresses at elongations in the four directions was 50 MPa or less, the difference between the maximum value of the stresses and the minimum value of the stresses at 15% elongations in the four directions was 70 MPa or less, and any one of the moduli of elasticity in the four directions fell within a range from 2.0 to 3.5 GPa. Moreover, in each of Examples 1 to 67, the standard deviations of the thicknesses in the four directions were 0.4 μm or less, and the polyester film was also excellent in the thickness uniformity.

As can also be seen from Examples shown in Table 7 such property values as described above were satisfied also in the winding width edges of the taken up fill rolls, and thus the polyester films satisfying the property values of the present invention across the full widths of the film rolls were able to be obtained.

In addition, the laminates obtained by using the polyester films satisfying such property values as specified in the present invention had high Erichsen values, and had uniform ductilities in all the directions when subjected to cold molding. In other words, the polyester film of each of Examples was free from the occurrence of the breakage of the aluminum foil, delamination or pinholes during cold molding, and thus had an excellent cold moldability.

On the other hand, in Comparative Examples 1 to 33, when the polyester films were obtained, the drawing magnification ratios ($DR_{MD}/DR_{TD}$) and the area magnifications ($DR_{MD} \times DR_{TD}$) were not within the ranges specified in the present invention, and thus the obtained polyester films did not satisfy the above-described property values of the present invention. In addition, in Comparative Example 34, the limiting viscosity of the polyester resin constituting the polyester film was high, and the relaxation heat treatment temperature was too low, and consequently the obtained polyester film did not satisfy the Dove-described property values of the present invention. Consequently, the laminates obtained by using the polyester films of these Comparative Examples 1 to 34 had low Erichsen values, and did not have uniform ductilities in all the directions when subjected to cold molding. Accordingly, during cold molding, for example, the aluminum foils were broken, delamination or pinholes occurred, and thus the laminates of Comparative Examples were poor in cold moldability,

REFERENCE SIGNS LIST

A Central point
X Sample for measurement of stress at elongation of polyester film in reference direction (0° direction)

The invention claimed is:

1. A polyester film being suitable for use in cold molding, wherein a polyester resin constituting the polyester film includes a polybutylene terephthalate resin (A) and a polyethylene terephthalate resin (B), a mass ratio (A/B) between the polybutylene terephthalate resin (A) and the polyethylene terephthalate resin (B) is 5/95 to 40/60,
an arbitrary direction on a film surface is defined to have an angle of 0°, and three directions are defined to have angles of 45°, 90°, and 135°, respectively, clockwise from the 0° direction, and a difference between a maximum value and a minimum value of stresses at 5% elongation in the four directions is 50 MPa or less,
the difference between the maximum value and the minimum value of the stresses at 15% elongation in the four directions is 70 MPa or less,
a modulus of elasticity in any one of the four directions falls within a range from 2.0 to 3.5 GPa, and
an average value of thicknesses in the four directions is 30 μm or less.

2. The polyester film according to claim 1, wherein a dry heat shrinkage rate in any one of the four directions falls within a range from 0 to 10%.

3. A method for producing the polyester film according to claim 2, wherein an undrawn sheet is successively biaxially drawn in such a way that
a first drawing for obtaining a first drawn film by drawing the undrawn sheet in a longitudinal direction (MD) is performed in a temperature range from 65 to 105° C.,
a second drawing for obtaining a second drawn film by drawing the first drawn film in a transverse direction (TD) is performed in a temperature range from 100 to 150° C.,
the temperature is increased sequentially along a film taking-up direction throughout the drawing process, and
a drawing magnification ($DR_{MD}$) in the longitudinal direction (MD) and a drawing magnification ($DR_{TD}$) in the transverse direction (TD) satisfy the following (a) and (b):

$$0.70 \leq DR_{MD}/DR_{TD} \leq 0.90 \quad \text{(a)}$$

$$12.5 \leq DR_{MD} \times DR_{TD} \leq 15.5 \quad \text{(b)}.$$

4. The method for producing a polyester film according to claim 3, wherein the film after the biaxial drawing is heat treated in a temperature range from 160 to 210° C.

5. The polyester film according to claim 1, wherein a standard deviation of the thicknesses in the four directions is 0.4 μm or less.

6. A method for producing the polyester film according to claim 5, wherein an undrawn sheet is successively biaxially drawn in such a way that
a first drawing for obtaining a first drawn film by drawing the undrawn sheet in a longitudinal direction (MD) is performed in a temperature range from 65 to 105° C.,
a second drawing for obtaining a second drawn film by drawing the first drawn film in a transverse direction (TD) is performed in a temperature range from 100 to 150° C.,
the temperature is increased sequentially along a film taking-up direction throughout the drawing process, and
a drawing magnification ($DR_{MD}$) in the longitudinal direction (MD) and a drawing magnification ($DR_{TD}$) in the transverse direction (TD) satisfy the following (a) and (b):

$$0.70 \leq DR_{MD}/DR_{TD} \leq 0.90 \quad \text{(a)}$$

$$12.5 \leq DR_{MD} \times DR_{TD} \leq 15.5 \quad \text{(b)}.$$

7. The method for producing a polyester film according to claim 6, wherein the film after the biaxial drawing is heat treated in a temperature range from 160 to 210° C.

8. A laminate being suitable for use in cold molding comprising the polyester film according to claim 1, and a metal foil.

9. The laminate according to claim 8, wherein the thickness of the metal foil is 15 to 80 μm.

10. The laminate according to claim 9, comprising the metal foil, an adhesive layer, and the polyester film.

11. A method for producing the polyester film according to claim 1, wherein an undrawn sheet is successively biaxially drawn in such a way that a first drawing for obtaining a first drawn film by drawing the undrawn sheet in a longitudinal direction (MD) is performed in a temperature range from 65 to 105° C., a second drawing for obtaining a second drawn film by drawing the first drawn film in a transverse direction (TD) is performed in a temperature range from 100 to 150° C., the temperature is increased sequentially along a film taking-up direction throughout the drawing process, and a drawing magnification ($DR_{MD}$) in the longitudinal direction (MD) and a drawing magnification ($DR_{TD}$) in the transverse direction (TD) satisfy the following (a) and (b):

$$0.70 \leq DR_{MD}/DR_{TD} \leq 0.90 \quad \text{(a)}$$

$$12.5 \leq DR_{MD} \times DR_{TD} \leq 15.5 \quad \text{(b).}$$

12. The method for producing a polyester film according to claim 11, wherein the film after the biaxial drawing is heat treated in a temperature range from 160 to 210° C.

* * * * *